United States Patent
Choudhuri et al.

(10) Patent No.: US 11,763,241 B2
(45) Date of Patent: Sep. 19, 2023

(54) MACHINE LEARNING FOR PAIN POINT IDENTIFICATION BASED ON OUTSIDE-IN ANALYSIS OF DATA

(71) Applicant: SAP SE, Walldorf (DE)

(72) Inventors: Saurabh Suman Choudhuri, Cumming, GA (US); William Bowers, Waghaeusel (DE); Mohammad Nabeel Siddiqui, Atlanta, GA (US)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 17/231,780

(22) Filed: Apr. 15, 2021

(65) Prior Publication Data

US 2022/0335356 A1  Oct. 20, 2022

(51) Int. Cl.
| | |
|---|---|
| *G06Q 10/00* | (2023.01) |
| *G06Q 10/0639* | (2023.01) |
| *G06N 20/20* | (2019.01) |
| *G06F 40/40* | (2020.01) |
| *G06N 5/01* | (2023.01) |

(52) U.S. Cl.
CPC ....... *G06Q 10/06393* (2013.01); *G06F 40/40* (2020.01); *G06N 5/01* (2023.01); *G06N 20/20* (2019.01)

(58) Field of Classification Search
None
See application file for complete search history.

(56) References Cited

U.S. PATENT DOCUMENTS

| | | | |
|---|---|---|---|
| 9,704,118 B2* | 7/2017 | Tanna | G05B 23/0229 |
| 10,262,375 B1 | 4/2019 | Howard | |
| 10,282,786 B1 | 5/2019 | Osborne et al. | |
| 11,170,332 B2* | 11/2021 | Koyama | G05B 23/0224 |
| 2014/0195272 A1 | 7/2014 | Sadiq et al. | |
| 2014/0289015 A1 | 9/2014 | Lim | |
| 2014/0324521 A1* | 10/2014 | Mun | G06Q 30/0201 |
| | | | 705/7.28 |
| 2016/0034923 A1 | 2/2016 | Majumdar et al. | |

(Continued)

OTHER PUBLICATIONS

Fanaei, Seyedeh Sara, Application of Machine Learning in Predicting Key Performance Indicators for Construction Projects, Oct. 2018, IRJET, https://www.irjet.net/archives/V5/i10/IRJET-V5I10276.pdf, p. 1-8. (Year: 2018).*

(Continued)

*Primary Examiner* — Joseph M Waesco
(74) *Attorney, Agent, or Firm* — SCHWEGMAN LUNDBERG & WOESSNER, P.A.

(57) ABSTRACT

In an example embodiment, machine learning is utilized to automatically identify pain points of an entity. More particularly, a random forest search algorithm receives inputs from a number of different outside-in data engines. These inputs are segregated in terms of key performance indexes (KPIs), which is then fed to a random forest decision tree. The random forest search algorithm calculates a p-value for each KPI. This p-value may then be used to identify the most relevant KPIs (such as by ranking the KPIs by their respective p-values). Rules are utilized not to identify the pain points themselves, but instead to define sorting preferences (refine the ranking). Based on a combination of the p-values and the evaluation of the rules, the top-N pain points may be identified.

20 Claims, 18 Drawing Sheets

(56) References Cited

U.S. PATENT DOCUMENTS

| | | | | |
|---|---|---|---|---|
| 2018/0012183 A1* | 1/2018 | Sou | ................... | G06Q 30/0201 |
| 2018/0220314 A1* | 8/2018 | Chen | ................... | H04W 24/04 |
| 2018/0225605 A1* | 8/2018 | Fabara | ............... | G06Q 10/0635 |
| 2018/0276063 A1* | 9/2018 | Mendes | .............. | G06F 11/3409 |
| 2018/0293511 A1* | 10/2018 | Bouillet | ................. | H04L 67/12 |
| 2018/0293911 A1* | 10/2018 | Rastegar-Panah | ....... | G09B 5/02 |
| 2019/0164101 A1* | 5/2019 | Koyama | .......... | G06Q 10/06393 |
| 2019/0372345 A1* | 12/2019 | Bain | ................. | G06Q 30/0601 |
| 2020/0019911 A1* | 1/2020 | Powers | ............. | G06F 16/24578 |
| 2020/0210647 A1* | 7/2020 | Panuganty | ............. | G06N 20/10 |
| 2020/0342068 A1* | 10/2020 | Cai | ......................... | G06F 30/20 |
| 2020/0394534 A1* | 12/2020 | Krishnan | ................ | G06F 17/15 |
| 2021/0019357 A1* | 1/2021 | Bennett | .................. | G06F 40/20 |

OTHER PUBLICATIONS

Ballou, Elizabeth, "How to Use Gamification in Mobile App Onboarding", Boxes and Arrows LLC, [Online]. Retrieved from the Internet: <URL: https://boxesandarrows.com/how-to-use-gamification-in-mobile-app-onboarding/>, (Oct. 17, 2017), 17 pgs.

Shi, Chuan, et al., "Routine Driving Infotainment App: Gamification of Performance Driving", Adjunct Proceedings of the 4th International Conference on Automotive User Interfaces and Interactive Vehicular Application, [Online]. Retrieved from the Internet: <URL: https://www.auto-ui.org/12/adjunct-proceedings/w6-02-shi.pdf>, (2012), 3 pgs.

* cited by examiner

MACHINE LEARNING FOR PAIN POINT IDENTIFICATION BASED ON OUTSIDE-IN ANALYSIS OF DATA

TECHNICAL FIELD

This document generally relates to machine learning. More specifically, this document relates to machine learning for pain point identification based on out-side in analysis of data.

BACKGROUND

Identifying company pain points from large amounts of data can be a useful process in a variety of different contexts. A company pain point is a problem area in the company's business operation (either internally or externally) that results in some sort of problem for the company (usually less profit, but non-monetary results are possible as well). For example, a software manufacturer may have an easier time convincing a company to use software that the software manufacturer produces if it can show that its use of the software will increase the company's profit by reducing or eliminating a pain point.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
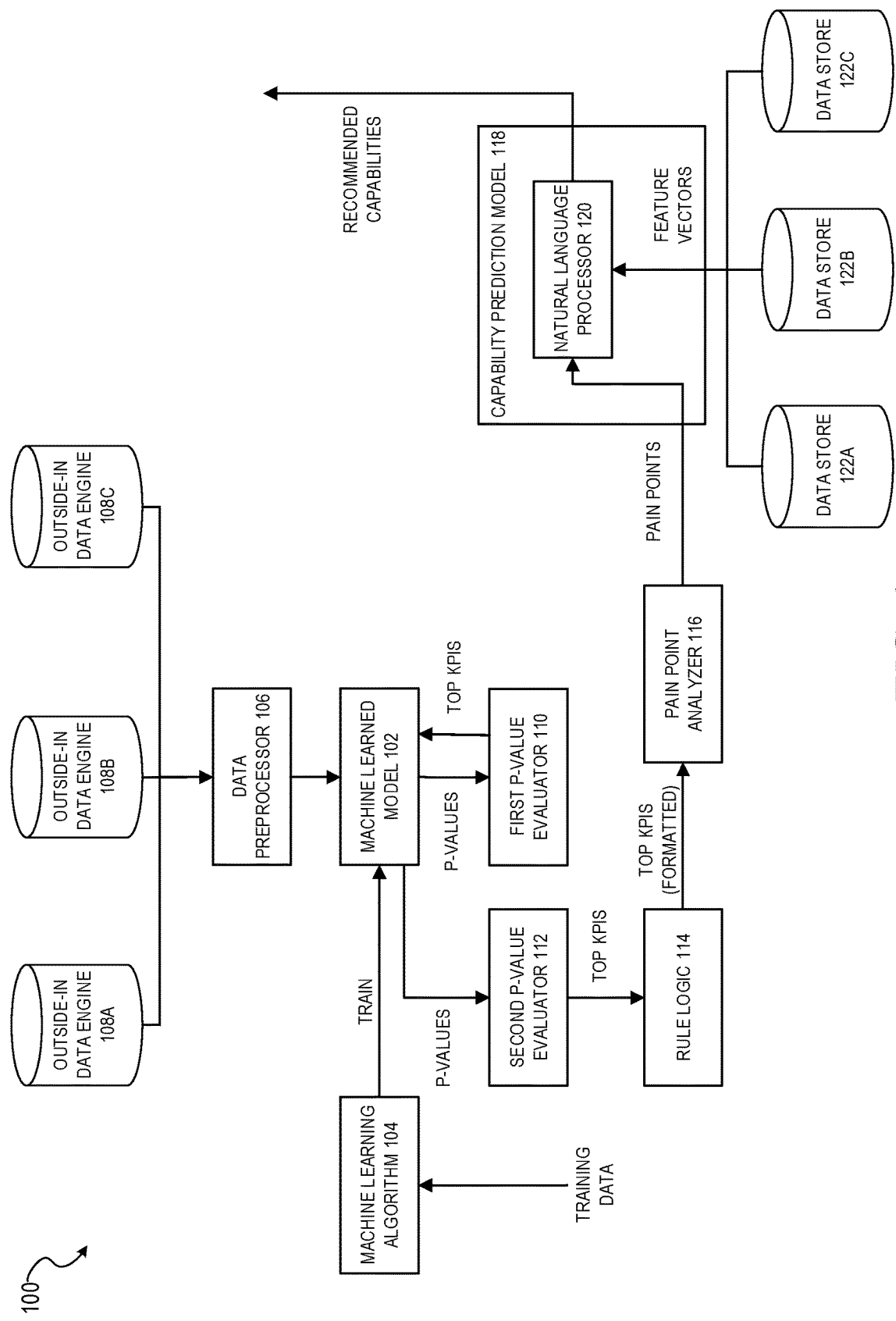
FIG. 1 is a block diagram illustrating a system for identifying and analyzing pain points, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In order to reduce or eliminate company pain points, there needs to be a way to identify company pain points.

Typically company pain points are identified explicitly by the company. For example, the software manufacturer will simply ask the company what the company's pain points are, and then determine which products it has that can alleviate these pain points and by how much. It can then use this information to convince the company to use the products. This process, however, creates a pain point of its own—namely the business contact at the company needs to be aware of the pain point (either through direct analysis by him or herself, or by contacting another person inside the company with that information), and needs to explicitly specify that pain point to the software manufacturer. It would be beneficial if there were a way to automate this process. Automation of this process, however, can be technically challenging as each company is unique. An approach where rules were used, for example, to automatically identify pain points at a company would not be useful as the rules would need to be customized for each company. What is needed is a solution for automating identification of pain points that can work on a variety of different companies and does not require customized rules for each company.

In an example embodiment, machine learning is utilized to automatically identify pain points of a company. More particularly, a random forest search algorithm receives inputs from a number of different outside-in data engines. These inputs are segregated in terms of key performance indexes (KPIs), which is then fed to a random forest decision tree. The random forest search algorithm calculates a p-value for each KPI. This p-value may then be used to identify the most relevant KPIs (such as by ranking the KPIs by their respective p-values). Rules are utilized but not to identify the pain points themselves but instead to define sorting preferences (refine the ranking). Based on a combination of the p-values and the evaluation of the rules, the top-N pain points may be identified.

In an example embodiment, a pain point analyzer may then take each of the top N-pain points and use a natural language processor to search for text matching the top N-pain points in one or more value drivers. These value drivers may have a many to one relationship with company pain points. Value drivers are aspects of the software product that can be utilized to reduce or eliminate pain points.

In an example embodiment, the identified value drivers may then be fed into an interactive user interface that presents the identified value drivers as recommendations to users, such as employees of the company. The user interface allows the users to establish one or more goals, and then may present the process of achieving the goals as spaces in a virtual gameboard. Users are then able to utilize the interactive user interface to drag and drop the identified value drivers as spaces in the virtual gameboard, and the user interface is then automatically updated to visually depict the effect of utilizing the identified value driver on the path of achieving the goal(s).

FIG. 1 is a block diagram illustrating a system 100 for identifying and analyzing pain points, in accordance with an example embodiment. The system includes a machine learned model 102 trained by a machine learning algorithm 104 to compute a p-value indicative of an importance of a key performance indicator in input data. In an example embodiment, the machine learned model 102 is a random forest learner tree, and the machine learning algorithm 104 is a random forest learner. The random forest learner learns a random forest learner tree, which comprises a number of decision trees. It should be noted that in other example embodiments the machine learned model 102 may be a different machine learned model trained by a different machine learning algorithm, including, for example, logistic regression, support vector machine, naive Bayes classifier, and neural networks.

Referring specifically to the random forest learner environment, each decision tree represents a series of decisions to arrive at a particular result (typically the classification of a piece of data). The nodes represent the decisions, with the edges between nodes represent the different potential paths that can be followed depending upon the decisions made, with leaf nodes (also called predictor nodes) representing final results (again, typically classification of the data).

The random forest learner tree comprises a large number of individual decision trees that operate as an ensemble. Each individual tree in the random forest outputs a classification prediction, and the classification with the most "votes" becomes the model's prediction. A large number of relatively uncorrelated models (trees) operating as a committee outperforms any individual constituent model. The decision trees protect each other from their individual errors.

In order to keep the individual decision trees uncorrelated with each other, either bagging (bootstrap aggregation or feature randomness (or both) may be used. In bootstrap aggregation, each individual decision tree is permitted to randomly sample from the data set with replacement, resulting in different trees. Feature randomness forces each decision tree in a random forest, when splitting nodes, to select only from a random subset of features, rather than considering every possible feature and selecting the one that produces the most separation between the observations in the left child node rather than the right child node. This forces more variation amongst the trees in the forest.

In an example embodiment, the data input into the machine learned model 102 include key performance indexes (KPIs) about a company. Examples of KPIs include revenue, pre-tax margin, and cost of goods sold. These KPIs may be identified by a data preprocessor 106, which segregates data from one or more outside-in data engines 108A, 108B, 108C into the KPIs. This may be thought of as a preprocessing step for the data input to the machine learned model 102, although as will be seen these same or similar operations can also be performed on the training data prior to it being submitted to the machine learning algorithm 104 to train the machine learned model 102.

An outside-in data engine 108A, 108B, 108C is a data source that maintains company information from outside of the company (such as aggregated from publicly available sources). Examples include CapitalIQ database, Security and Exchange Commission (SEC) databases, and Move the Needle™ databases from SAP SE, of Frankfurt, Germany. Each of these databases may be accessible via application program interfaces (APIs), and requests for data may be performed via these APIs.

The data received from the outside-in data engine(s) 108A, 108B, 108C may be raw and either unstructured or semi structured. In some example embodiments, the data may be fully structured but not structured in a way compatible with the machine learned model 102. As such, the data preprocessor 106 acts to organize and format the data in a manner compatible with the machine learned model 102. Specifically, the data processor segregates the data into a plurality of KPIs. The data within each of the KPIs is organized by company (among the company being examined and the company's peers, as identified by a mapping of company peer groups).

The preprocessed data may then be fed a first time into the machine learned model 102. In the case where the machine learned model 102 is a random forest learner tree, as mentioned above the random forest learner tree comprises a large number of individual decision trees that operate as an ensemble. In an example embodiment, each of these individual decision trees correspond to a different data source (i.e., a different one of the outside-in data engine(s) 108A, 108B, 108C. The random forest learner tree is trained by the machine learning algorithm 104 to determine the reliability of each KPI input to it, based on how consistent the data is among the different data sources. This reliability may be expressed in terms of a p-value, with range of 0 to 1, with 0 being completely unreliable and 1 being completely reliable.

Figure 2:
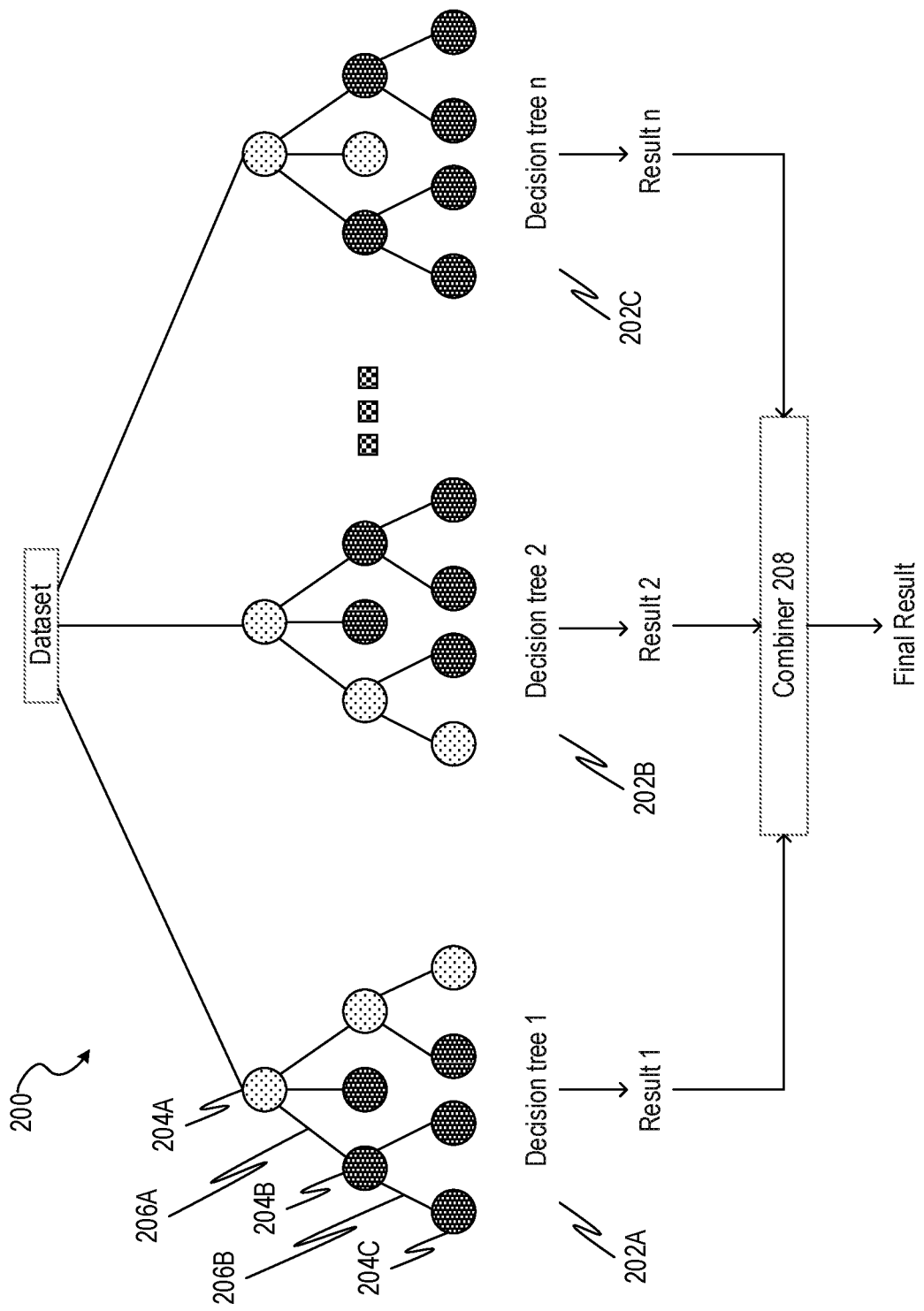
FIG. 2 is a diagram illustrating a random forest learner tree in accordance with an example embodiment.

FIG. 2 is a diagram illustrating a random forest learner tree 200 in accordance with an example embodiment. The random forest learner tree 200 contains multiple decision trees 202A, 202B, 202C, each of which corresponds to a different data source. Each decision tree 202A, 202B, 202C contains a series of nodes (e.g., nodes 204A, 204B, 204C) and edges (e.g., edges 206A, 206B). Output of the decision trees 202A, 202B, 202C are combined at combiner 208, which may perform averaging or majority voting, and that combined value may represent a p-value for each KPI input to the random forest learner tree 202.

Referring back to FIG. 1, the machine learning algorithm 104 may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models. Examples of unsupervised learning algorithms include expectation-maximization algorithms, vector quantization, and information bottleneck method. Here the weights learned may be weights applied to features of KPI data, and may be learned by the machine learning algorithm trying different weights, then examining the results of a loss function applied to a score produced by applying the weights to a particular piece of training data. If the loss function is not satisfied, the machine learning algorithm adjusts the weights and tries again. This is repeated in a number of iterations until the loss function is satisfied, and the weights are learned. When the weights are applied to feature values for a particular input KPI, it is able to determine a p-value for the KPI, based at least partially upon consistency of the values in the KPI data for the KPI among the multiple data sources.

The resulting p-values for the KPIs are output to a first p-value evaluator 110, which determines whether the p-value for each KPI is greater than or equal to a predetermined threshold (e.g., 0.50). KPIs whose p-values fall below this predetermined threshold are filtered out, leaving only KPIs whose p-values are equal to or greater than the predetermined threshold. The KPIs whose p-values are equal to or greater than the predetermined threshold are then fed back into the machine learned model 102, which again determines a p-value for each of these KPIs (the machine learned model 102 may have updated itself based on the data evaluations from the first iteration, but additionally the "random" part of the random forest learner tree allows for different p-values to be output for a single KPI on separate iterations). A second p-value evaluator 112 also then determines whether the p-value for each KPI is greater than or equal to a predetermined threshold. In an example embodiment, this is the same predetermined threshold as used by the first p-value evaluator (e.g., 0.50), although in some embodiments it may be different.

KPIs whose p-values are equal to or greater than the predetermined threshold after this second iteration are then considered reliable and passed to a rule logic 114. By iterating the machine learned model 102 at least twice and only outputting KPIs with p-values greater than or equal to the predetermined threshold in both iterations, the chances of potentially overloading the rule logic 114 with too many KPIs is significantly reduced. The rule logic 114 contains one or more rules indicating how each KPI is to be evaluated (e.g., whether high values for a particular KPI are considered better or worse than low values). As an example, there may be one set of rules for identifying a set of KPIs to select (e.g., "rank KPIs in order of p-value and take top 5 KPIs with the highest p-values) and a second set of rules for indicating how corresponding KPIs should be evaluated (e.g., "(Revenue higher is good) (COGS lower is good)(Pretax Margin Higher is good)." These rules may then be evaluated on the KPIs whose p-values are equal to or greater than the predetermined threshold from the second p-value evaluator, to obtain structured, organized, and formatted KPI data, which will be referred to as post-processing KPI data.

Figure 3:
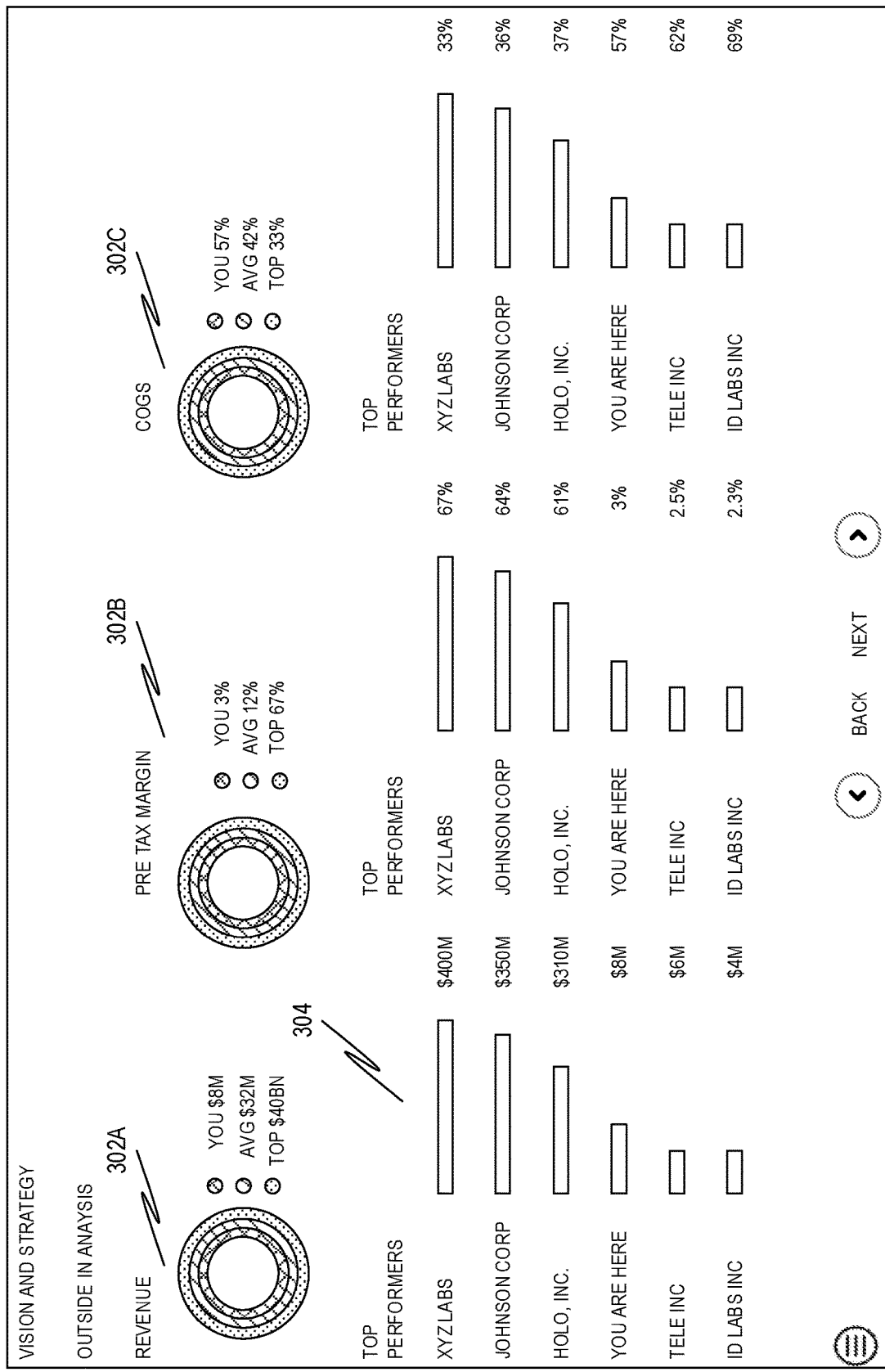
FIG. 3 is a screen capture illustrating a user interface for displaying post-processing KPI data, in accordance with an example embodiment.

FIG. 3 is a screen capture illustrating a user interface 300 for displaying post-processing KPI data, in accordance with an example embodiment. It should be noted that it is not necessary that the post-processing KPI data be displayed to the user at this point (or ever), and it is also possible that only some of the post-processing KPI data will be displayed and some will not. Nevertheless, the user interface 300 provides a visual guide as to how the post-processing KPI data has been organized and indicated. As can be seen FIG. 3, three KPIs 302A, 302B, 302C are depicted. The company's performance in each KPI 302A, 302B, 302C is ranked among its peers (such as in section 304) based on the rules in the rule logic 114.

Referring back to FIG. 1, the post-processing KPI data may then be fed to a pain point analyzer 116. The pain point identifier applies its own set of rules to identify which KPIs within the post-processing KPI data represent pain points for the company. For example, there may be rules indicating particular value ranges for particular KPIs that are considered "great", "average", or "poor". KPIs that have been assigned a rating of "poor" (and optionally KPIs that have been assigned a rating of "average") may be identified as pain points.

It should be noted that while the pain point analyzer is described as a rule-based component, it may in some example embodiments be implemented as its own machine learned model, which may take features of the company or company data and use it to identify which KPIs are considered pain points. This machine learned model may be trained by a machine learned algorithm, using training data comprising sample company data and sample KPI data, along with labels indicating which sample KPI data corresponding to which sample company data are considered pain points. The machine learning algorithm may then learn which features of the company data and of the KPI data are important in determining whether KPI data is a pain point or not. Examples of supervised learning algorithms include artificial neural networks, Bayesian networks, instance-based learning, support vector machines, linear classifiers, quadratic classifiers, k-nearest neighbor, decision trees, and hidden Markov models. Examples of unsupervised learning algorithms include expectation-maximization algorithms, vector quantization, and information bottleneck method. Here the weights learned may be weights applied to features of company data and KPI data, and may be learned by the machine learning algorithm trying different weights, then examining the results of a loss function applied to a score produced by applying the weights to a particular piece of training data. If the loss function is not satisfied, the machine learning algorithm adjusts the weights and tries again. This is repeated in a number of iterations until the loss function is satisfied, and the weights are learned.

In this way, for example, a company whose company data indicates the company is something of an outlier from peer companies may have pain point analysis adjusted, such as a startup company that has only 20 employees may not have a revenue value in the bottom half of its peer group (of larger companies) considered to be a pain point while a more established (and larger) company may have a similar revenue value ranking among its peered considered to be a pain point.

Figure 4:
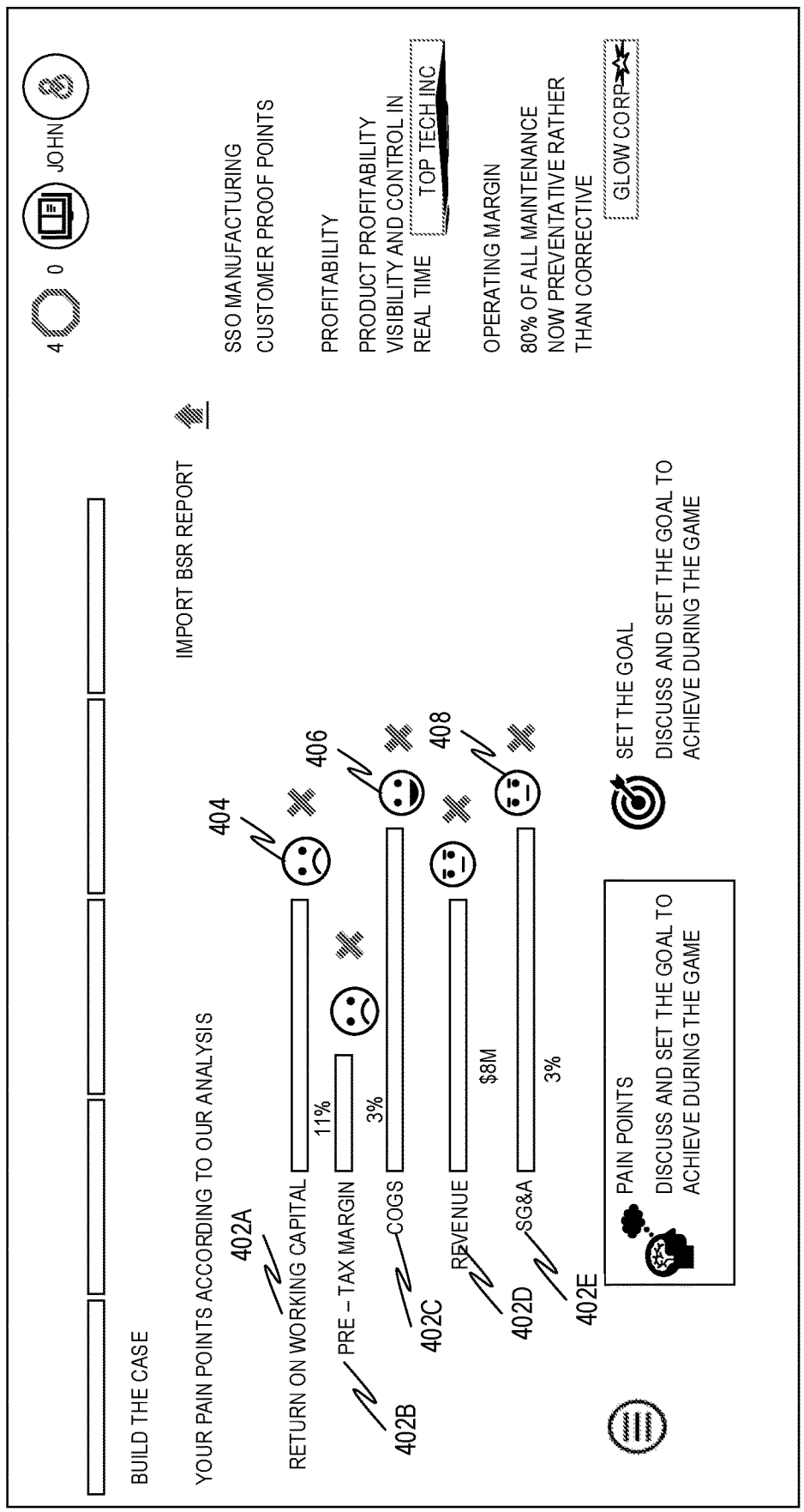
FIG. 4 is a screen capture illustrating a user interface displaying pain points, in accordance with an example embodiment.

FIG. 4 is a screen capture illustrating a user interface 400 displaying pain points, in accordance with an example embodiment. It should be noted that it is not necessary that the pain points be displayed to the user at this point (or ever), and it is also possible that only some of the pain points will be displayed and some will not. Nevertheless, the user interface 400 provides a visual guide as to how the pain points are identified. As can be seen FIG. 4, five KPIs 402A-402E are depicted, along with indicators of whether or not they are pain points. KPIs 402A and 402B have "sad face" indicators 404A, 404B, indicative of pain points. KPI 402C has a "happy face" indicator 406, indicative of a non-pain point. KPIs 402D and 404E have "neutral face" indicators 408, which can be considered either pain points or non-pain points, depending upon what the pain point analyzer 116 decides.

Referring back to FIG. 1, the pain points, which are KPIs that have been identified as pain points by the pain point analyzer 116 may then be passed to a capability prediction model 118, and specifically to a natural language processor 120 within the capability prediction model 118. The natural language processor 120 employs natural language processing (NLP) techniques to match text in the pain points with one or more value driver definitions. These valued driver definitions are stored in one or more data stores 122A, 122B, 122C. The natural language processor 120 performs NLP techniques on the pain points and on feature vectors and labels extracted from the value driver definitions to identify matches between the pain points and one or more capabilities expressed in the value driver definitions.

Figure 5:
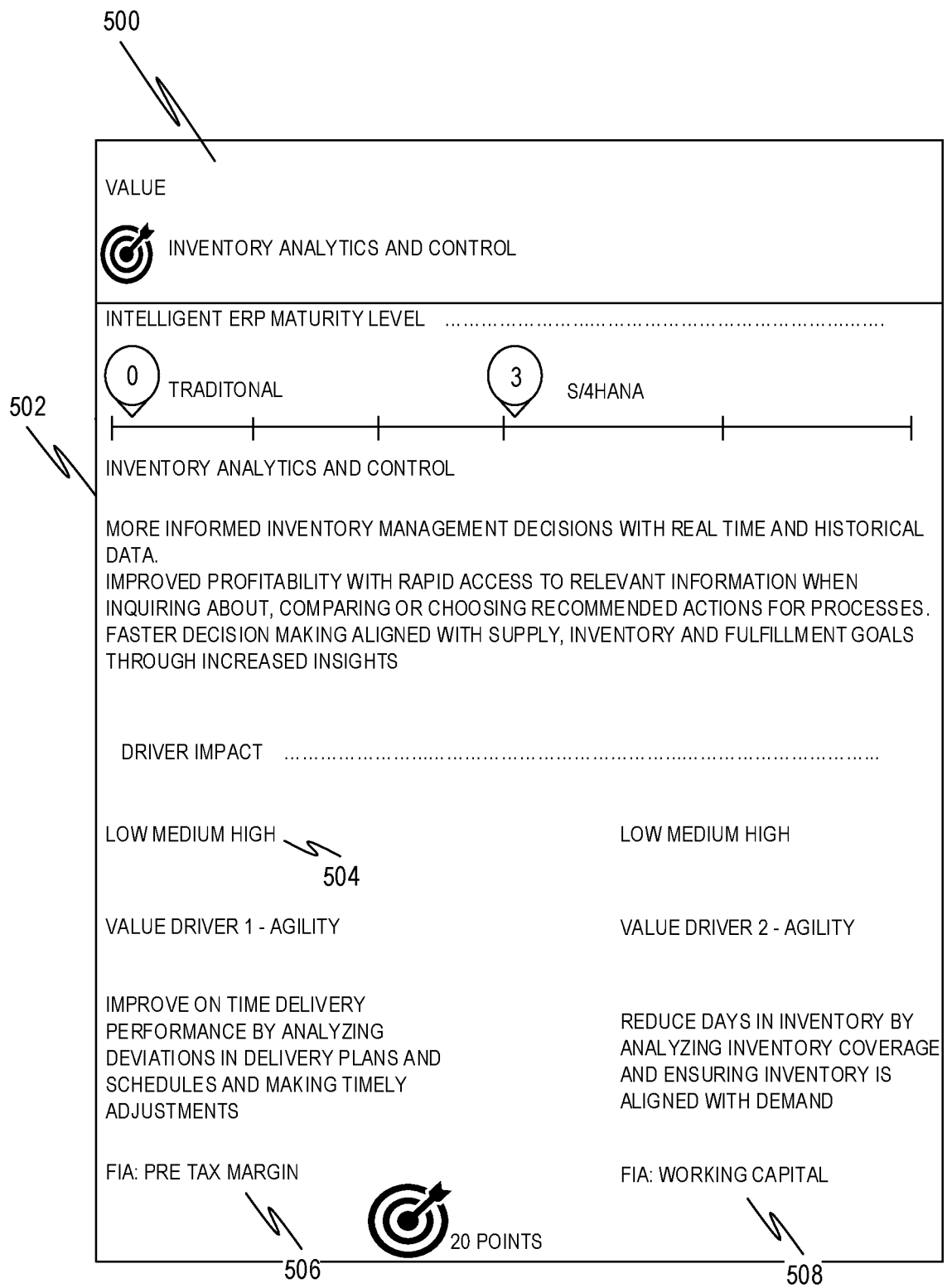
FIG. 5 is a screen capture illustrating an example value driver definition stored in a first data store in accordance with an example embodiment.
Figure 6:
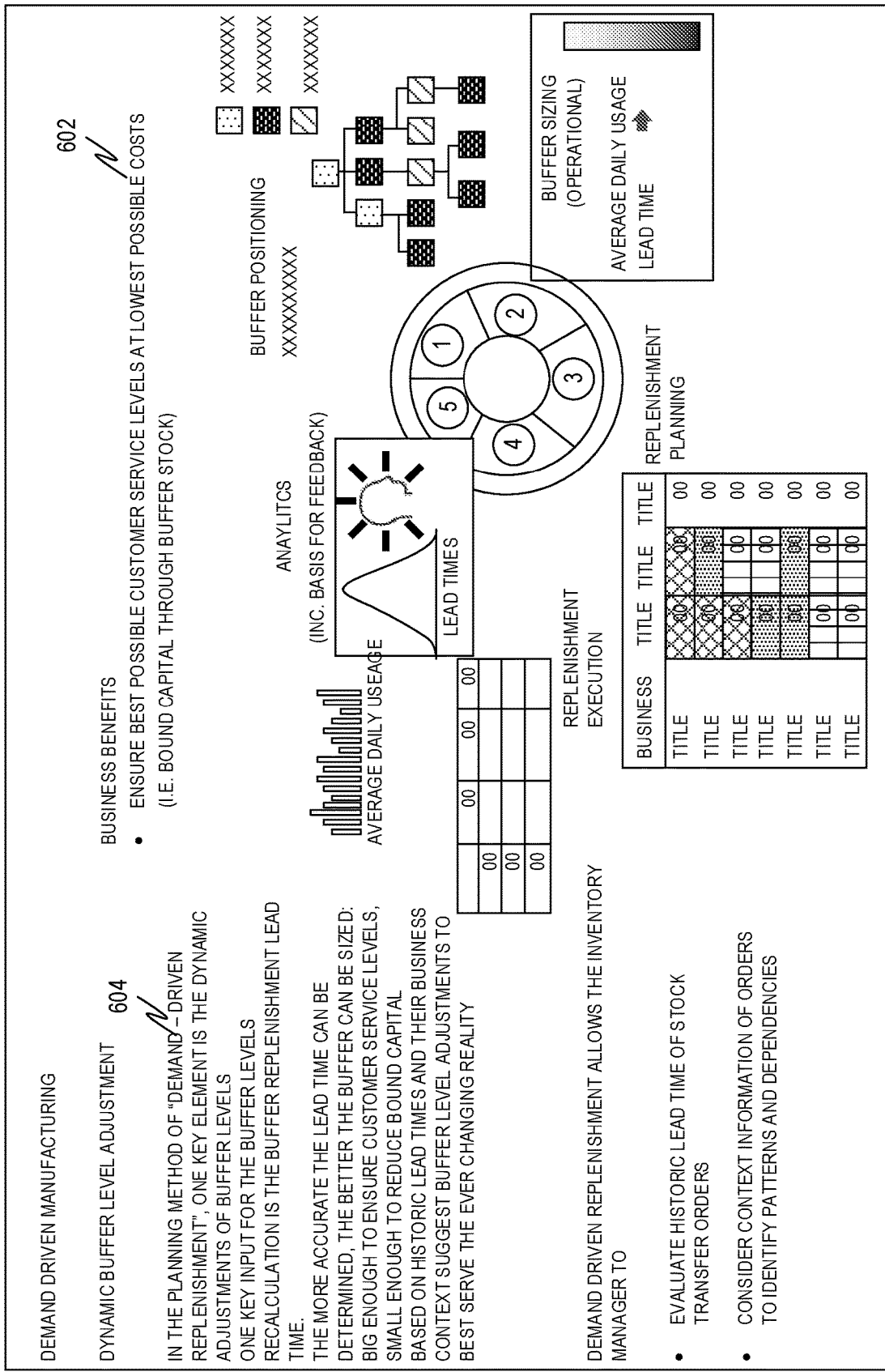
FIG. 6, on the other hand, is a screen capture illustrating an example value driver definition stored in a second data store, in accordance with an example embodiment.

Each value driver definition is an explanation of a feature of the software product and how it can impact various KPIs. The value driver definition may also indicate a level of how much the feature can impact the various KPIs. There may be multiple value driver definitions that impact each KPI (i.e., there is a many-to-one relationship between value driver definitions and KPIs). These value driver definitions may be stored in different ways in different data stores 122A, 122B, 122C, and the natural language processor 120 uses the NLP techniques to handle the various different formats and ways the value driver definitions are stored. For example, FIG. 5 is a screen capture illustrating an example value driver definition 500 stored in a first data store in accordance with an example embodiment. Here the value drive "inventory analytics and control" 502 is explicitly described as having a high 504 impact on both the Pre-tax margin KPI 506 and the working capital KPI 508, although NLP techniques are still utilized to determine that this is exactly what was meant by the text and the placement of the text. FIG. 6, on the other hand, is a screen capture illustrating an example value driver definition 600 stored in a second data store, in accordance with an example embodiment. Here, in contrast to FIG. 5, the value driver definition 600 is less explicit, and the NLP needs to infer from discussions of low costs 602 that the value driver "demand-driven manufacturing" 604 has an impact on the cost of goods sold KPI.

Referring back to FIG. 1, in an example embodiment the natural language processor 120 includes one or more Bidirectional Encoder Representations from Transformers (BERT). BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

Figure 7:
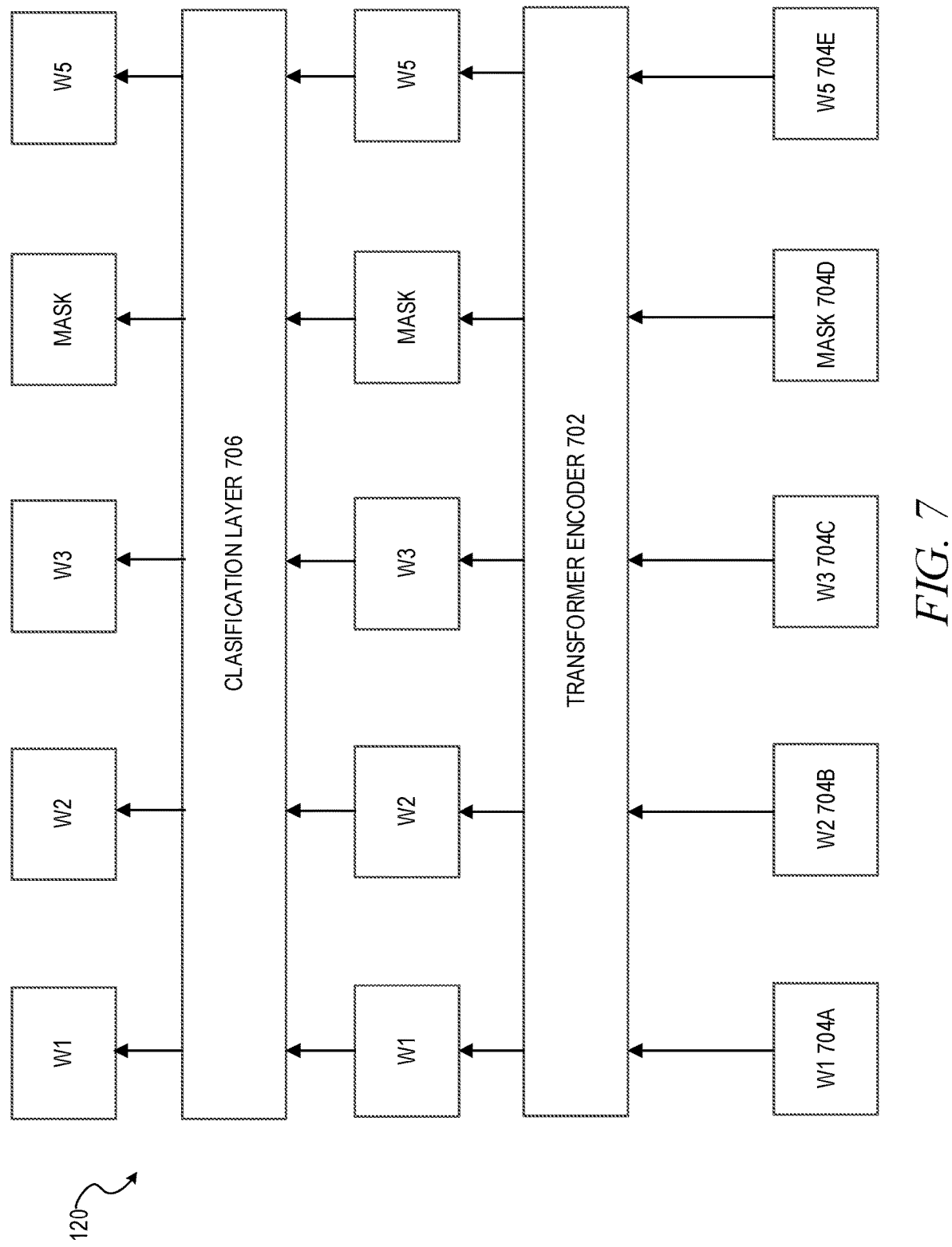
FIG. 7 is a block diagram illustrating a natural language processor including a transformer encoder, in accordance with an example embodiment.

More specifically, the transformer encoder reads the entire sequence of information at once, and thus is considered to be bidirectional (although one could argue that it is, in reality, non-directional). This characteristic allows the model to learn the context of a piece of information based on all of its surroundings. FIG. 7 is a block diagram illustrating a natural language processor 120 including a transformer encoder 702, in accordance with an example embodiment. The input is a sequence of tokens, which are first embedded into vectors and then processed in a neural network. The output is a sequence of vectors 704A-704E of size K, in which each vector corresponds to an input token with the same index. In one implementation, before feeding the vectors 704A-704E into the transformer encoder 702, a preset number of the vectors 704A-704E are replaced with a mask token. The model then attempts to predict the original value of the masked pieces of information, based on the context provided by the other, non-masked, pieces of information in the sequence. A classification layer 706 is added on top of the encoder output and the output vectors are multiplied by an embedding matrix, transforming them into a vocabulary dimension. The probability of each piece of information in the vocabulary can be calculated with softmax or a similar function.

It should be noted that a BERT model is only one example of a natural language processor that could be used. In another example embodiment, the natural language processor 120 includes a FastText algorithm. FastText is a library for learning web embedding and text classification. The model allows the creation of an unsupervised learning or supervised learning algorithm for obtaining vector representations for pieces of information. It is based on a skipgram model, where each piece of information is represented as a bag of character n-grams. A vector representation is associated to each character n-gram, with pieces of information being represented as the sum of these representations.

In another example embodiment, the natural language processor 120 includes a neural network, such as a graph convolutional network (GCN). It breaks down an input into smaller pieces and performs feature extractions to make a classification decision. The CGN alternates between convolution and pooling layers. The convolution layers pass a filter over the source input and extract the important information from each piece. The pooling layers take the extracted information and downsample it to retain only the most important information. When the essential data is extracted, it is passed through a fully connected layer to arrive at the final classification decision. The CGN performs the convolution on a graph by passing a filter over the graph, looking for essential vertices and edges that can help classify nodes within the graph.

Once the natural language processor 120 matches one or more of the pain points to one or more value driver definitions, the corresponding value driver(s) may be output as recommendations in a graphical user interface. Thus, for example, these recommendations may indicate features of the software product that will drive certain value to solve certain pain points of the company. This graphical user interface may be presented to a decision maker at the company, who may decide to utilize or not utilize the software product based on the recommendations.

In an example embodiment, the graphical user interface may be interactive and have a unique presentation that appears "game-like" to the user.

Figure 8:
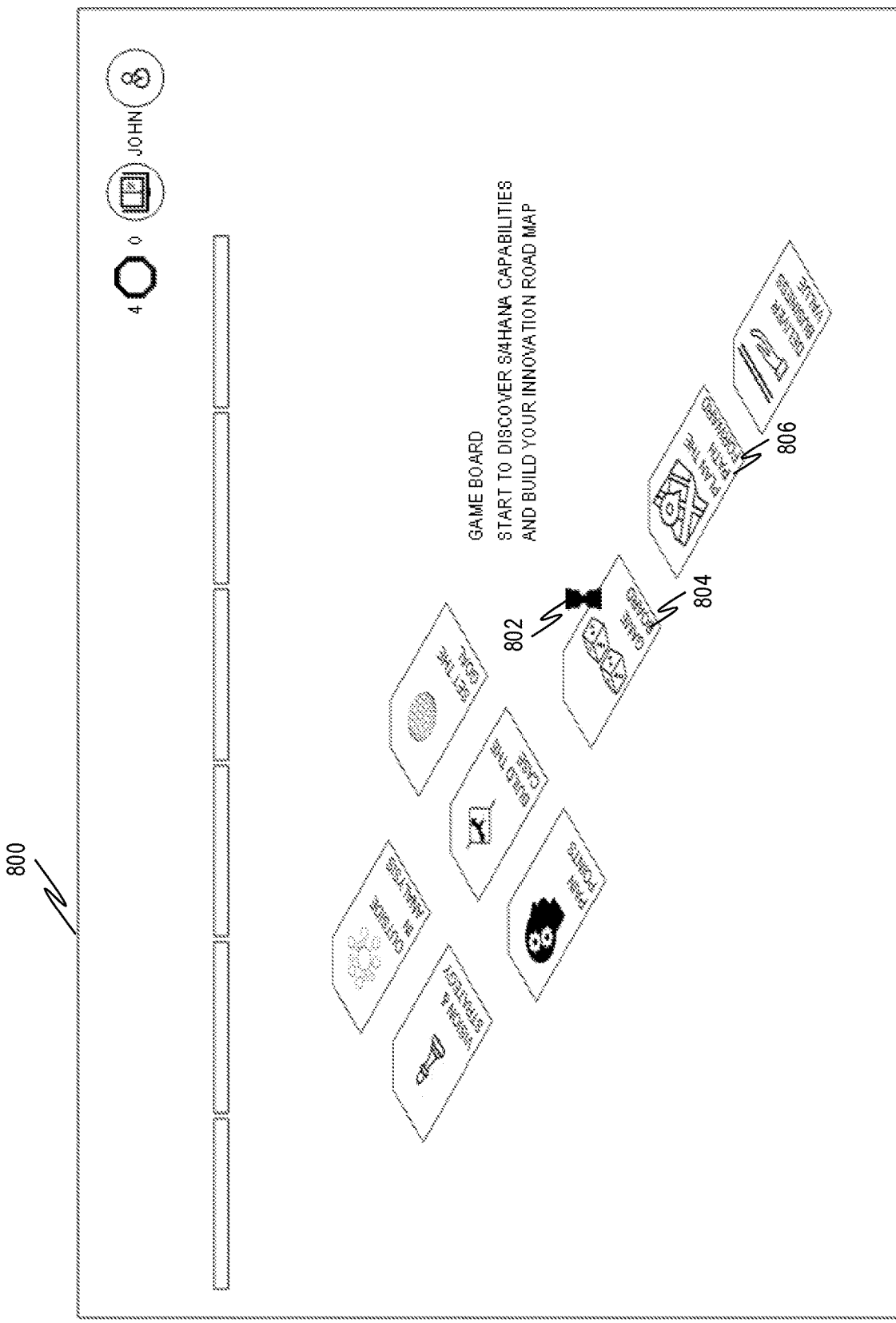
FIG. 8 is a screen capture illustrating a game board user interface in accordance with an example embodiment.

FIG. 8 is a screen capture illustrating a game board user interface 800 in accordance with an example embodiment. Here, the user is provided with a playing piece 802 and can move the playing piece 802 from one space, such as space 804, to another space, such as space 806, to advance to a next screen in the user interface.

Figure 9:
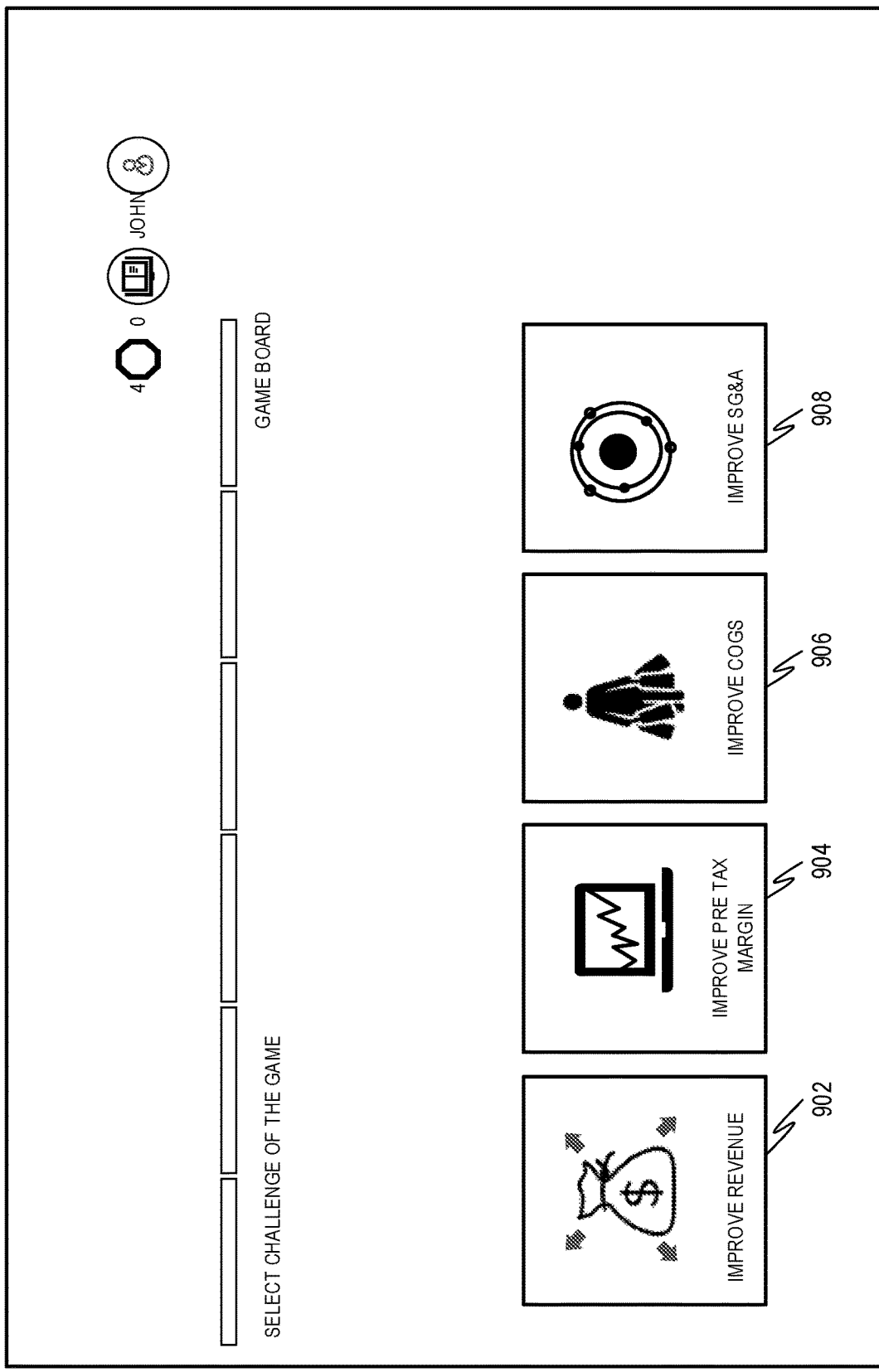
FIG. 9 is a screen capture illustrating a screen challenge selection user interface, in accordance with an example embodiment.

FIG. 9 is a screen capture illustrating a screen challenge selection user interface 900, in accordance with an example embodiment. Here, the user is able to select from different challenges for the game, such as challenges 902, 904, 906, and 908. Assuming the user selects challenge 904, the user has selected to improve pre-tax margin.

Figure 10:
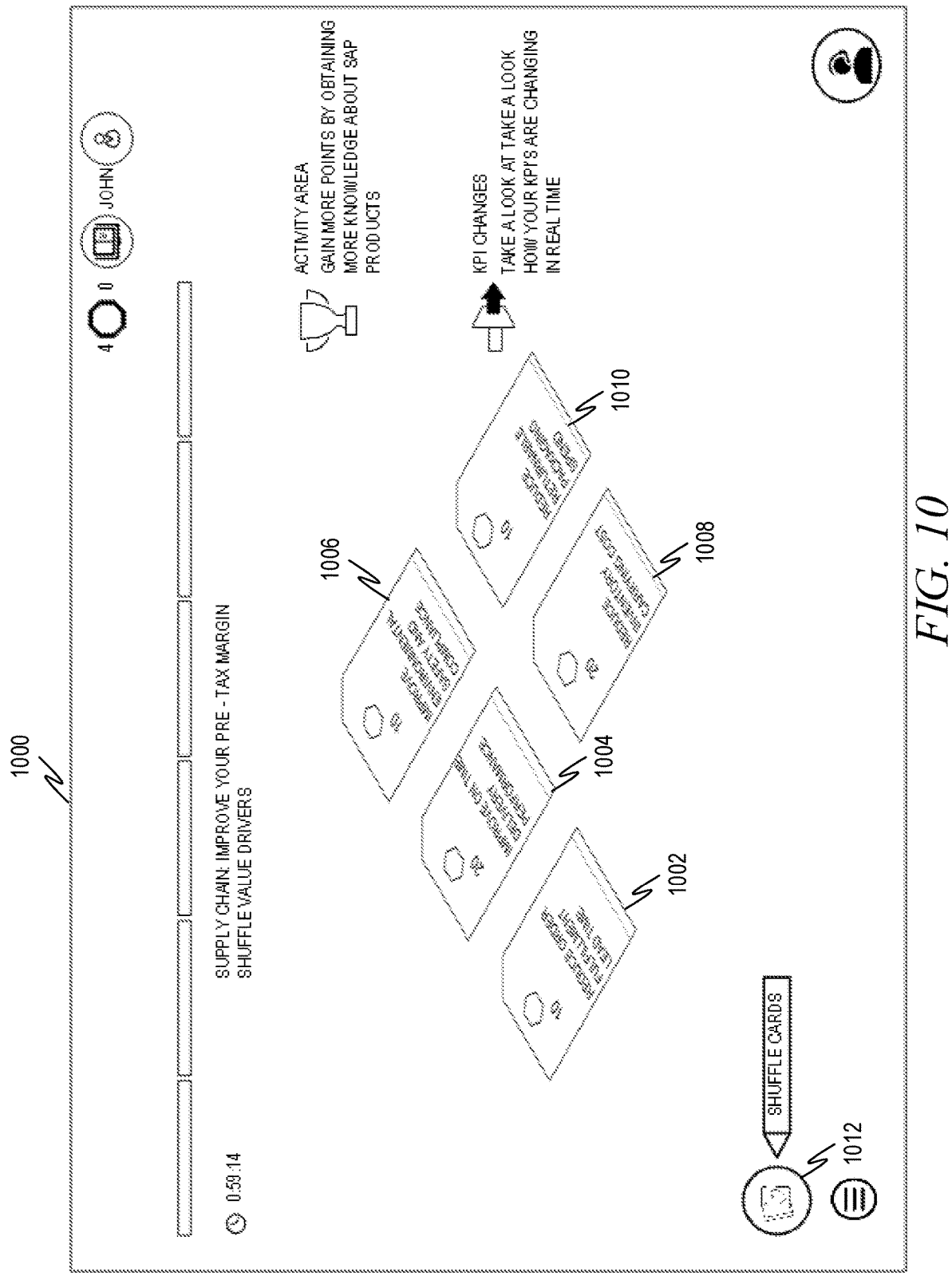
FIG. 10 is a screen capture illustrating an interactive value driver card screen in accordance with an example embodiment.

FIG. 10 is a screen capture illustrating an interactive value driver card screen 1000 in accordance with an example embodiment. Here, the user is able to select from a plurality of different recommended value drivers, depicted as different cards 1002, 1004, 1006, 1008, 1010 in the user interface. These recommended value drivers may be recommended based on the identified pain points for the company of the user, as described earlier in this document. The user may select a "shuffle cards" button 1012, to shuffle the interactive value driver cards 1002, 1004, 1006, 1008, 1010 on the screen (and potentially off the screen, if there are more cards than available display).

Figure 11:
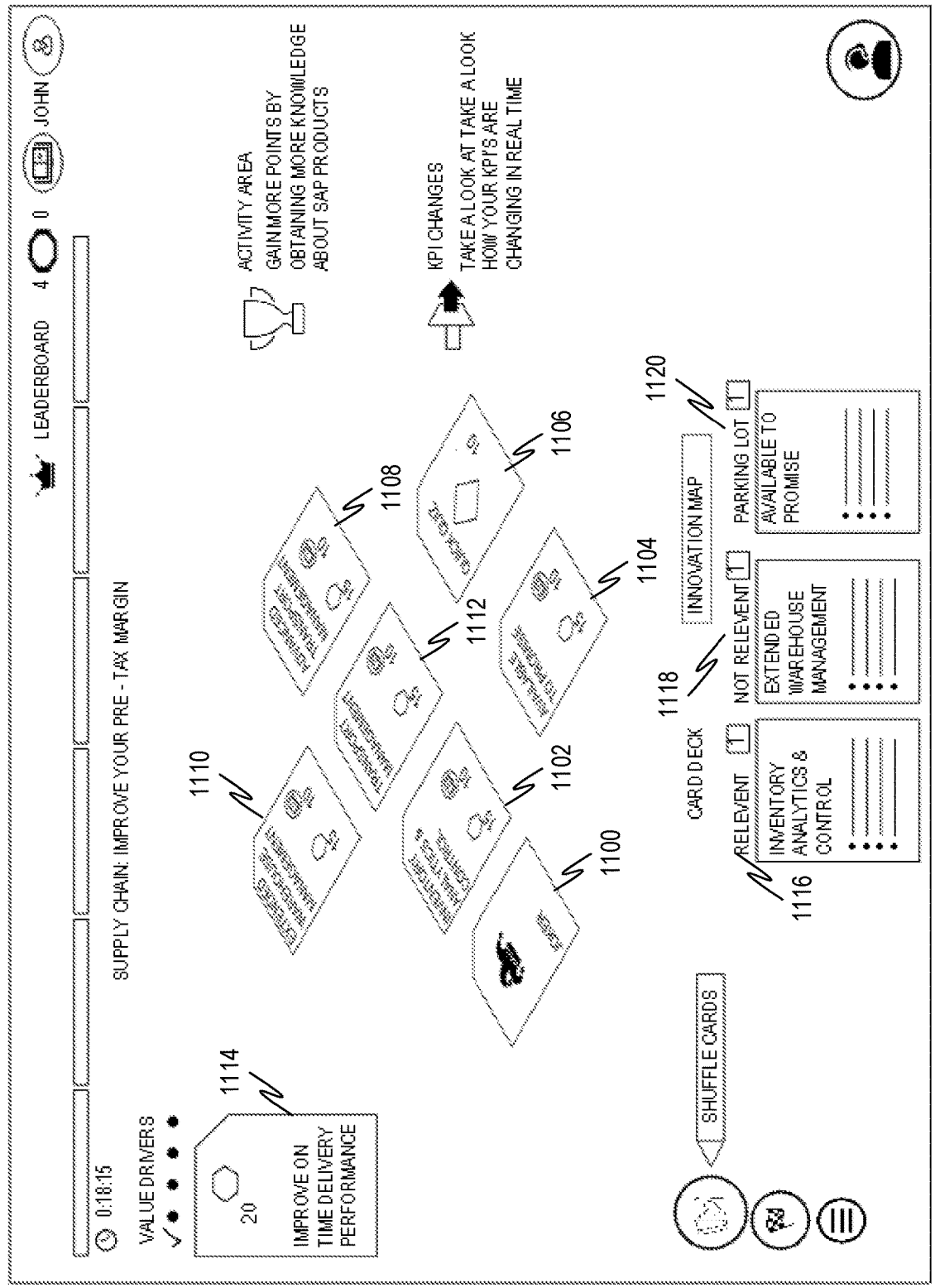
FIG. 11 is a screen capture illustrating an additional screen of the interactive value driver card screen, in accordance with an example embodiment.

FIG. 11 is a screen capture illustrating an additional screen of the interactive value driver card screen 1000, in accordance with an example embodiment. Here, additional cards 1100, 1102 have been added to add additional capabilities. Card 1100 is a joker card, indicating a surprise action or recommendation should the user select this card 1100, as would happen in a board game. This adds an element of fun and surprise to the process. Card 1102 is a quiz about the KPIs and/or value drivers, to test how well the user has been paying attention to the "game" so far. The user can also drag and drop the cards 1102, 1104, 1106, 1108, 1110, 1112, 1114 to relevant 1116, not relevant 1118, or parking lot 1120 areas, which are indicative of their usefulness to the user (parking lot 1120 are being indicative of an unknown or uncertain usefulness).

Figure 12:
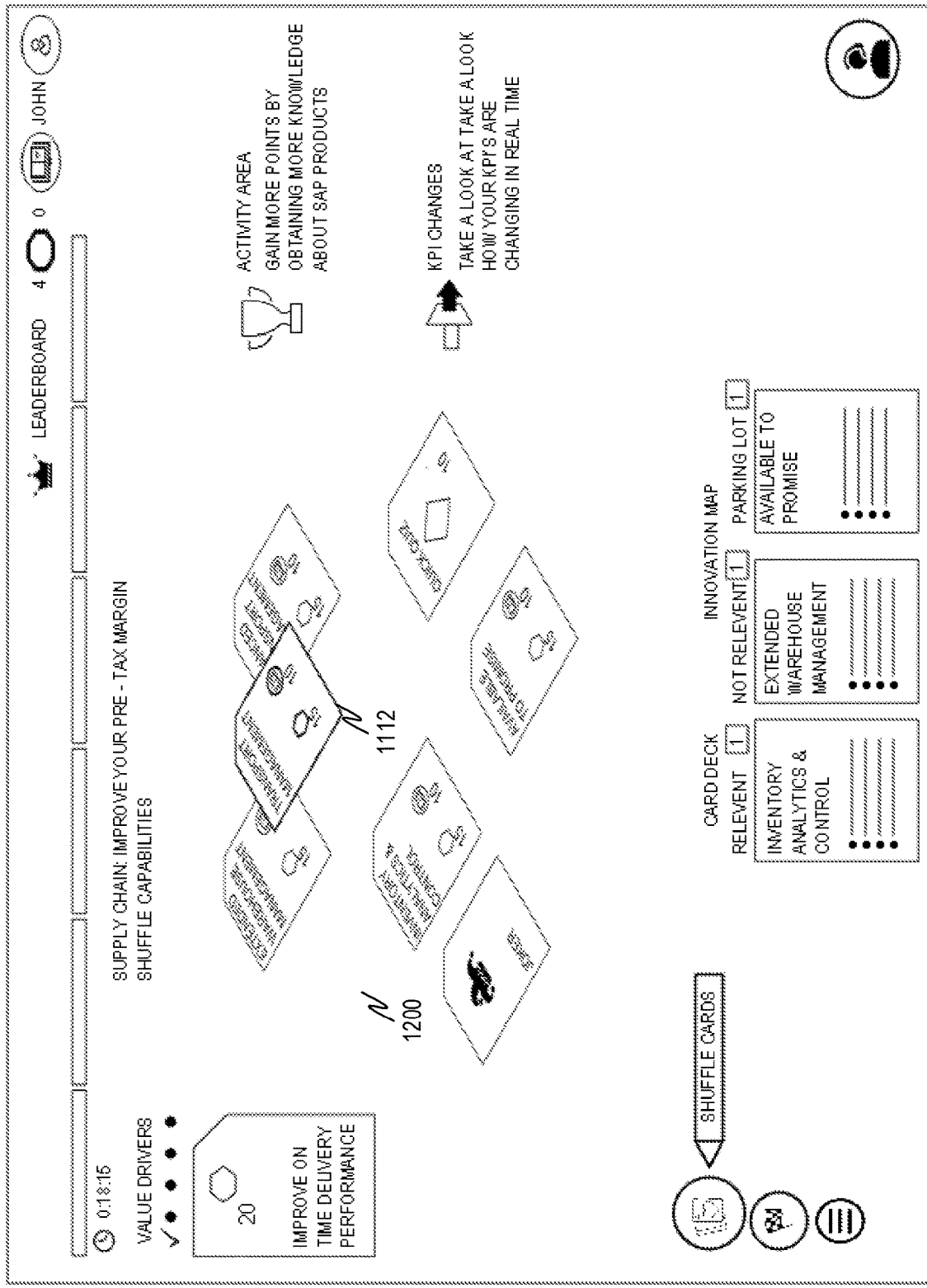
FIG. 12 is a screen capture illustrating a user selection of value driver card, in accordance with an example embodiment.

FIG. 12 is a screen capture illustrating a user selection of value driver card 1008, in accordance with an example embodiment. Here, card 1112 is animated to hover above the rest of the game board 1200.

Figure 13:
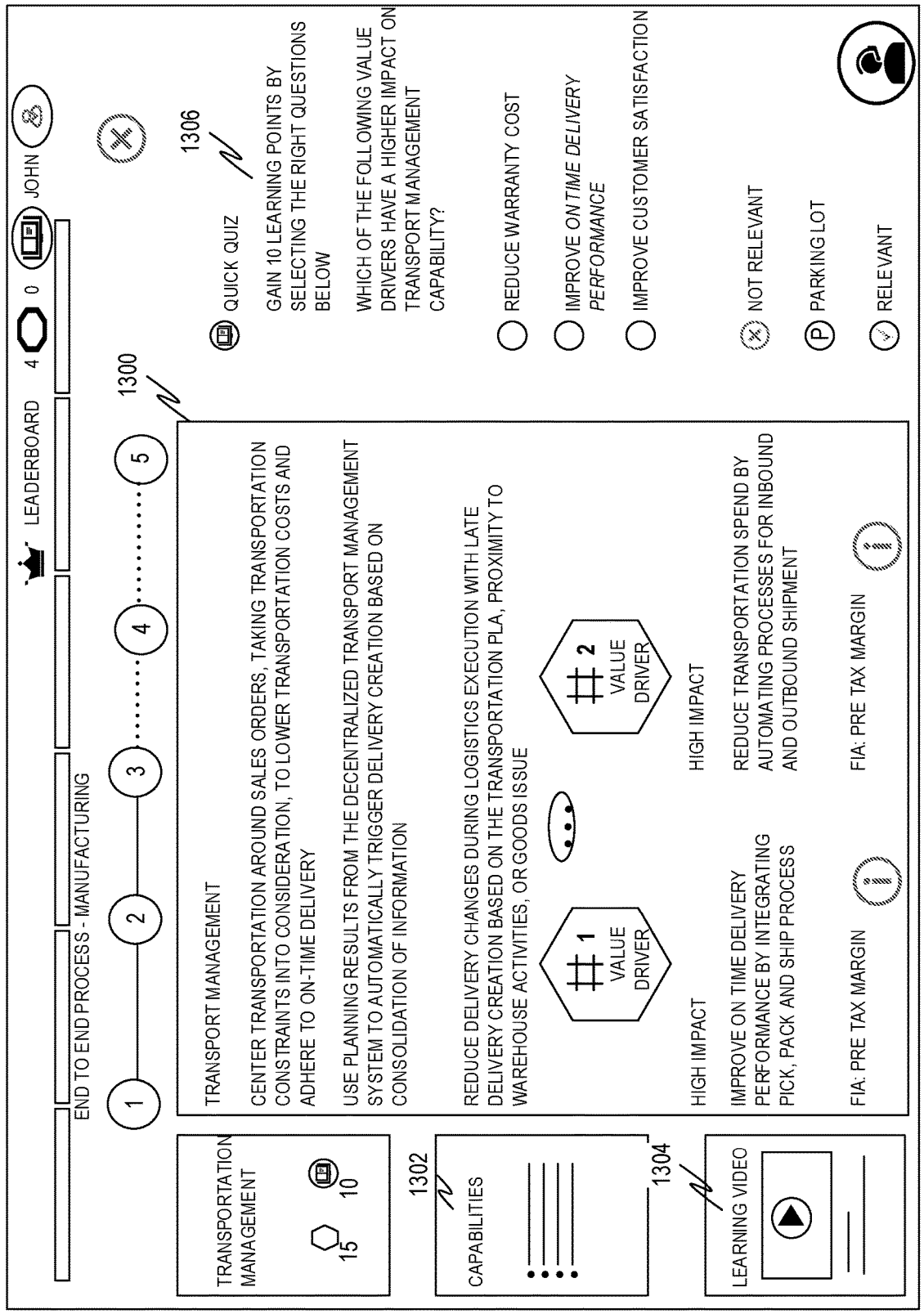
FIG. 13 is a screen capture illustrating a selected value driver card in more detail, in accordance with an example embodiment.

FIG. 13 is a screen capture illustrating a selected value driver card 1008 in more detail. Here, the user has selected the "transportation management" card, and the value driver definition 1300 (as described earlier in this document) is presented in the user interface. Additionally, provided are a list of capabilities 1302 of the software product with respect to the corresponding value driver, a learning video 1304 about the value driver, and a quiz 1306 about the value driver.

Figure 14:
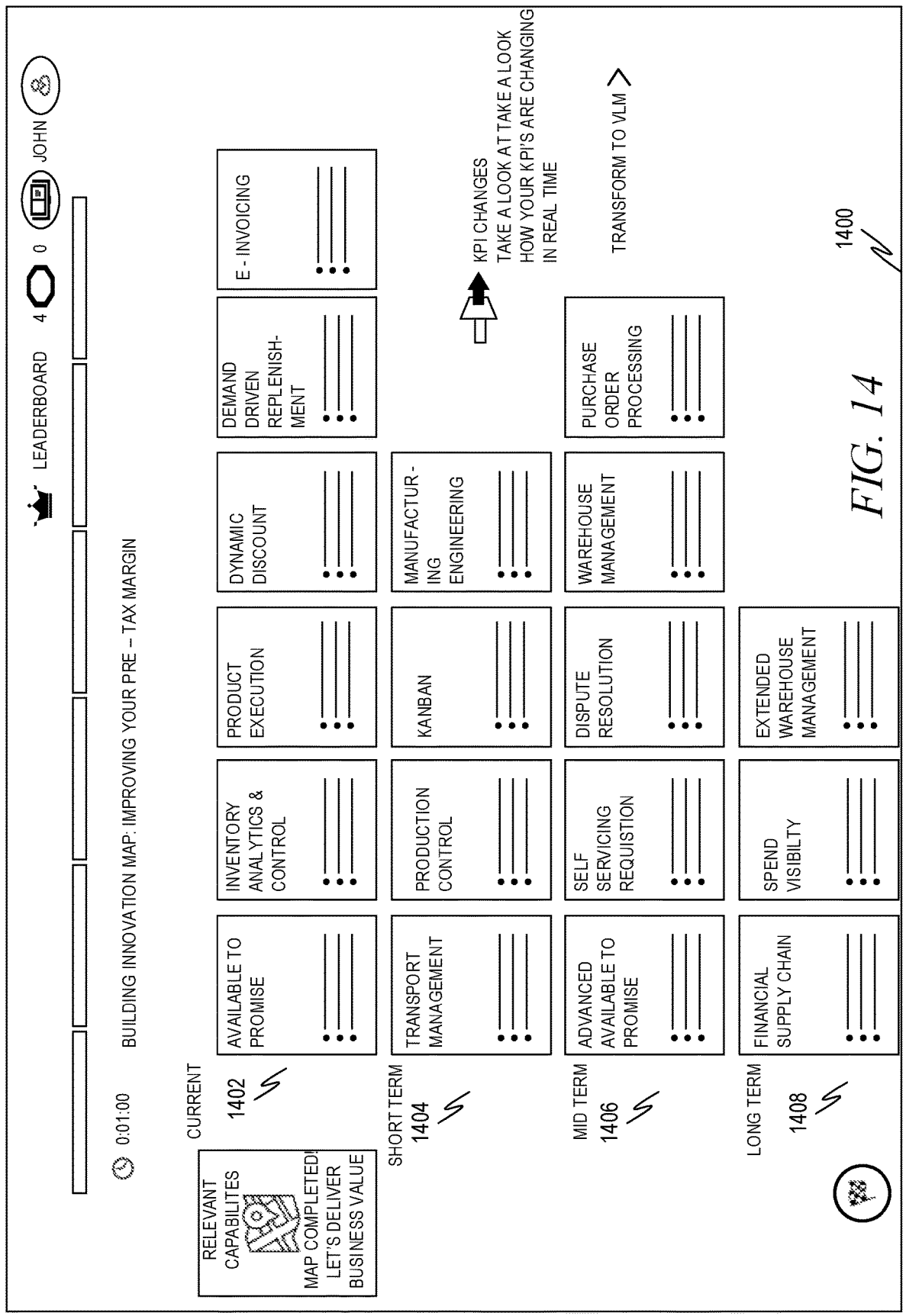
FIG. 14 is a screen capture illustrating an innovation map screen in accordance with an example embodiment.

FIG. 14 is a screen capture illustrating an innovation map screen 1400 in accordance with an example embodiment. Here, various value driver cards can be placed by the user into different categories based on importance and timing of execution. Some cards are depicted as having been placed in the "current" category 1402, for example, indicative of current execution by the company. Some cards are depicted as having been placed in the "short-term" category 1404, for example, indicative of short-term execution by the company. Some cards are depicted as having been placed in the "mid-term" category 1406, for example, indicative of mid-term execution by the company. Some cards are depicted as having been placed in the "long-term" category 1408, for example, indicative of long-term execution by the company.

Figure 15:
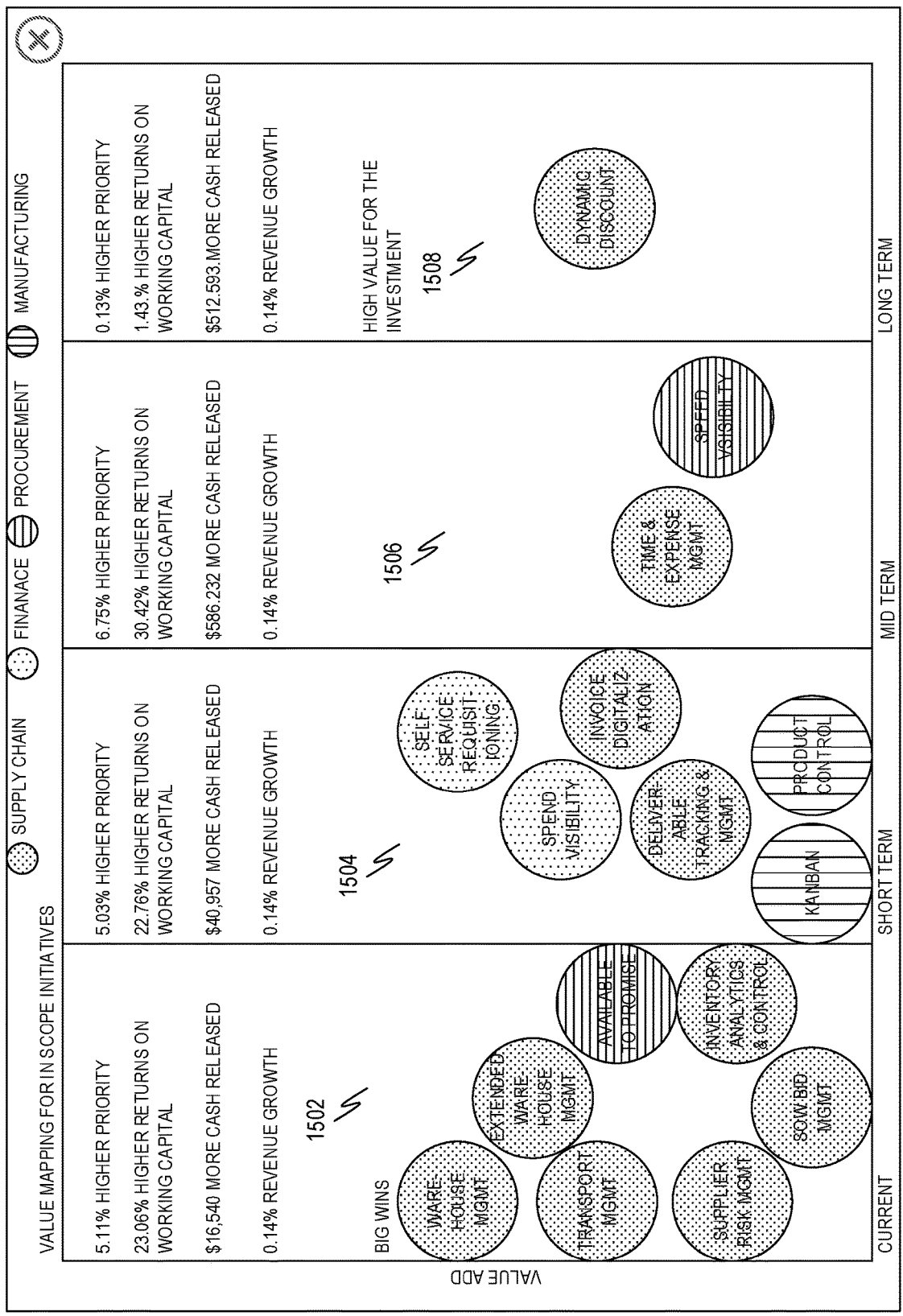
FIG. 15 is a screen capture illustrating a value mapping screen in accordance with an example embodiment.

FIG. 15 is a screen capture illustrating a value mapping screen 1500 in accordance with an example embodiment. Here, various value drivers are shown as circles within categories 1502, 1504, 1506, 1508. Also presented are statistics for each category, assuming the corresponding value drivers are implemented, such as statistics 1510.

Figure 16:
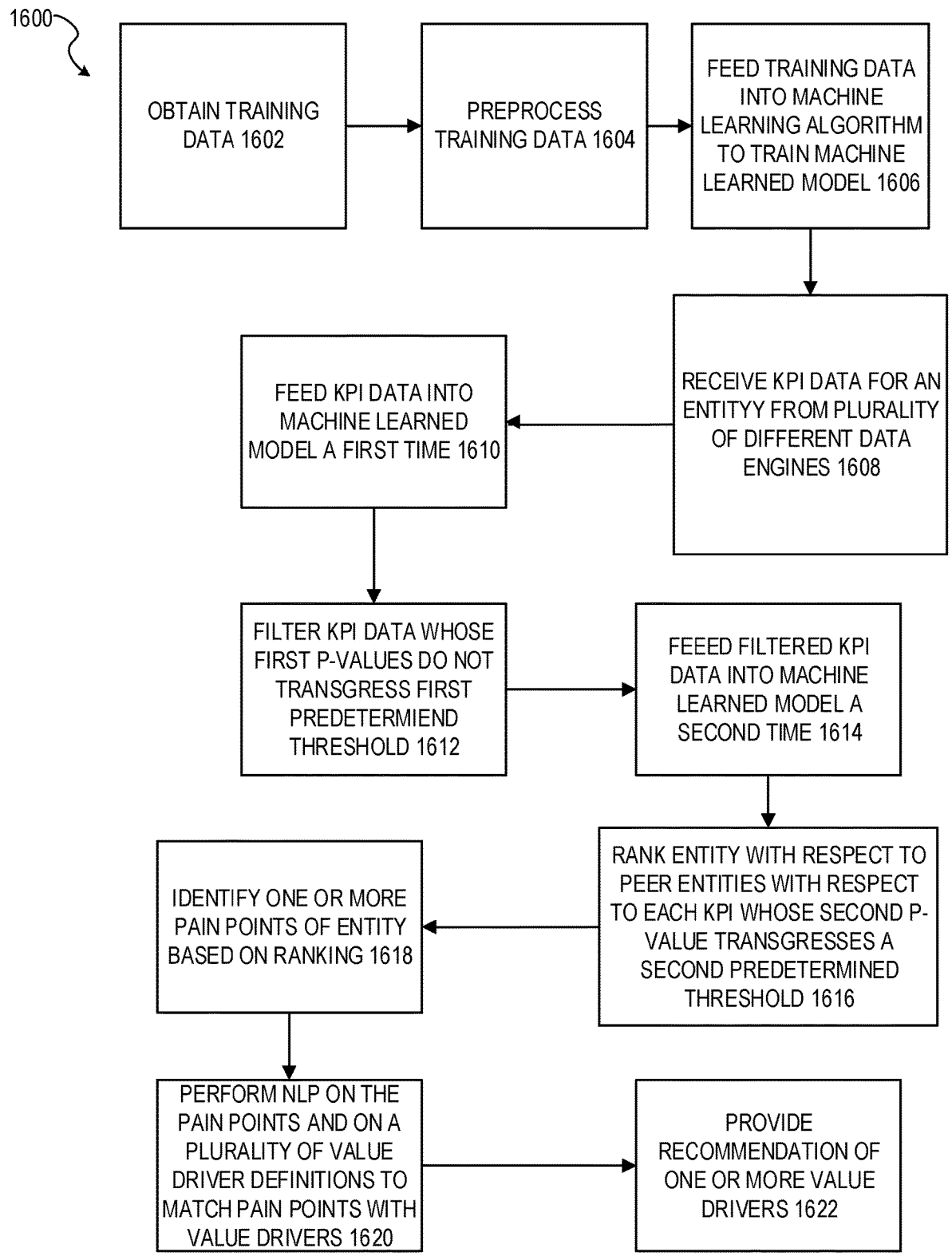
FIG. 16 is a flow diagram illustrating a method for identifying pain points in company data using machine learning, in accordance with an example embodiment.

FIG. 16 is a flow diagram illustrating a method 1600 for identifying pain points in entity data using machine learning, in accordance with an example embodiment. An entity is any organization or portion of an organization, such as a company, charity, government, etc. that has data on which key performance indexes (KPIs) can be calculated. At operation 1602, training data, is obtained. The training data comprises sample KPI data from a plurality of sample entities. At operation 1604, the training data may be preprocessed to segregate the data into separate KPIs. At operation 1606, the training data is fed into a machine learning algorithm to train a machine learned model to output a p-value for a KPI when presented with KPI data corresponding to the KPI from a plurality of different data sources. The p-value is indicative of reliability of the KPI, based upon consistency among data sources. In an example embodiment, the machine learned model is a random forest learner tree with a different decision tree for each data source.

At operation 1608, KPI data for an entity is received from a plurality of different data engines. The KPI data includes data corresponding to a plurality of different KPIs. At operation 1610, the KPI data is fed into the machine learned model a first time, outputting a first p-value for each of the plurality of different KPIs. At operation 1612, the KPI data corresponding to KPIs whose first p-value does not transgress a first predetermined threshold is filtered out. Then, at operation 1614, the filtered KPI data is fed into the machine learned model a second time, outputting a second p-value for each of the KPIs in the filtered KPI data.

At operation 1616, the company is ranked with respect to peer companies with respect to each KPI whose second p-value transgresses a second predetermined threshold. This ranking may be performed using one or more rules specified in a rules logic. This ranking may further comprise discarding all but the top-N KPIs based on their respective second p-values, wherein N is an integer.

At operation 1618, based on the ranking, one or more pain points of the entity are identified. The identifying one or more pain points may be performed by identifying whether the ranking of the entity values with respect to peer companies with respect to each KPI whose second p-value transgresses a second predetermined threshold falls within a particular range for each KPI. That particular range may itself be predicted for the entity based on company features, using a second machine learned model.

At operation 1620, natural language processing is performed on the pain points and on a plurality of value driver definitions to match the pain points with value drivers described in the value driver definitions. Then at operation 1622, a recommendation of one or more value drivers is provided based on the one or more pain points.

In view of the disclosure above, various examples are set forth below. It should be noted that one or more features of an example, taken in isolation or combination, should be considered within the disclosure of this application.

Example 1.

A system comprising:

at least one hardware processor; and a computer-readable medium storing instructions that, when executed by the at least one hardware processor, cause the at least one hardware processor to perform operations comprising:

accessing a machine learned model, trained by a machine learning algorithm using training data to output a p-value for a KPI when presented with KPI data corresponding to the KPI from a plurality of different data sources, the p-value indicative of reliability of the KPI, the training data comprising sample key performance index (KPI) data from a plurality of sample entities;

receiving KPI data for an entity from a plurality of different data engines, the KPI data including data corresponding to a plurality of different KPIs;

feeding the KPI data into the machine learned model a first time, outputting a first p-value for each of the plurality of different KPIs;

filtering out the KPI data corresponding to KPIs whose first p-value does not transgress a first predetermined threshold;

feeding the filtered KPI data into the machine learned model a second time, outputting a second p-value for each of the KPIs in the filtered KPI data;

ranking the entity with respect to peer companies with respect to each KPI whose second p-value transgresses a second predetermined threshold; and based on the ranking, classifying one or more of the KPIs as pain points of the entity.

Example 2.

The system of Example 1, wherein the ranking is performed using one or more rules specified in a rules logic.

Example 3.

The system of Examples 1 or 2, wherein the ranking further comprises discarding all but the top-N KPIs based on their respective second p-values, wherein N is an integer.

Example 4.

The system of any of Examples 1-3, wherein the identifying one or more pain points is performed by identifying whether the ranking of the company values with respect to peer companies with respect to each KPI whose second p-value transgresses a second predetermined threshold falls within a particular range for each KPI.

Example 5.

The system of Example 4, wherein the particular range is predicted for the company based on company features, using a second machine learned model.

Example 6.

The system of any of Examples 1-5, wherein the operations further comprise:
performing natural language processing on the pain points and on a plurality of value driver definitions to match the pain points with value drivers described in the value driver definitions; and
providing a recommendation of one or more value drivers based on the one or more pain points.

Example 7.

The system of any of Examples 1-6, wherein the machine learned model is a random forest tree learner with a separate decision tree for each of the plurality of different data engines.

Example 8.

The system of any of Examples 1-7, wherein the first predetermined threshold is identical to the second predetermined threshold.

Example 9.

A method comprising:
accessing a machine learned model, trained by a machine learning algorithm using training data to output a p-value for a KPI when presented with KPI data corresponding to the KPI from a plurality of different data sources, the p-value indicative of reliability of the KPI, the training data comprising sample key performance index (KPI) data from a plurality of sample entities;
receiving KPI data for an entity from a plurality of different data engines, the KPI data including data corresponding to a plurality of different KPIs;
feeding the KPI data into the machine learned model a first time, outputting a first p-value for each of the plurality of different KPIs;
filtering out the KPI data corresponding to KPIs whose first p-value does not transgress a first predetermined threshold;
feeding the filtered KPI data into the machine learned model a second time, outputting a second p-value for each of the KPIs in the filtered KPI data;
ranking the entity with respect to peer companies with respect to each KPI whose second p-value transgresses a second predetermined threshold; and
based on the ranking, classifying one or more of the KPIs as pain points of the entity.

Example 10.

The method of Example 9, wherein the ranking is performed using one or more rules specified in a rules logic.

Example 11.

The method of Examples 9 or 10, wherein the ranking further comprises discarding all but the top-N KPIs based on their respective second p-values, wherein N is an integer.

Example 12.

The method of any of Examples 9-11, wherein the identifying one or more pain points is performed by identifying whether the ranking of the company values with respect to peer companies with respect to each KPI whose second p-value transgresses a second predetermined threshold falls within a particular range for each KPI.

Example 13.

The method of Example 12, wherein the particular range is predicted for the company based on company features, using a second machine learned model.

Example 14.

The method of any of Examples 9-13, further comprising:
performing natural language processing on the pain points and on a plurality of value driver definitions to match the pain points with value drivers described in the value driver definitions; and
providing a recommendation of one or more value drivers based on the one or more pain points.

Example 15.

The method of any of Examples 9-14, wherein the machine learned model is a random forest tree learner with a separate decision tree for each of the plurality of different data engines.

Example 16.

The method of any of Examples 9-15, wherein the first predetermined threshold is identical to the second predetermined threshold.

Example 17.

A non-transitory machine-readable medium storing instructions which, when executed by one or more processors, cause the one or more processors to perform operations comprising:

accessing a machine learned model, trained by a machine learning algorithm using training data to output a p-value for a KPI when presented with KPI data corresponding to the KPI from a plurality of different data sources, the p-value indicative of reliability of the KPI, the training data comprising sample key performance index (KPI) data from a plurality of sample entities;

receiving KPI data for an entity from a plurality of different data engines, the KPI data including data corresponding to a plurality of different KPIs; feeding the KPI data into the machine learned model a first time, outputting a first p-value for each of the plurality of different KPIs;

filtering out the KPI data corresponding to KPIs whose first p-value does not transgress a first predetermined threshold;

feeding the filtered KPI data into the machine learned model a second time, outputting a second p-value for each of the KPIs in the filtered KPI data;

ranking the entity with respect to peer companies with respect to each KPI whose second p-value transgresses a second predetermined threshold; and based on the ranking, classifying one or more of the KPIs as pain points of the entity.

Example 18.

The non-transitory machine-readable medium of Example 17, wherein the ranking is performed using one or more rules specified in a rules logic.

Example 19.

The non-transitory machine-readable medium of Examples 17 or 18, wherein the ranking further comprises discarding all but the top-N KPIs based on their respective second p-values, wherein N is an integer.

Example 20.

The non-transitory machine-readable medium of any of Examples 17-19, wherein the identifying one or more pain points is performed by identifying whether the ranking of the company values with respect to peer companies with respect to each KPI whose second p-value transgresses a second predetermined threshold falls within a particular range for each KPI.

Figure 17:
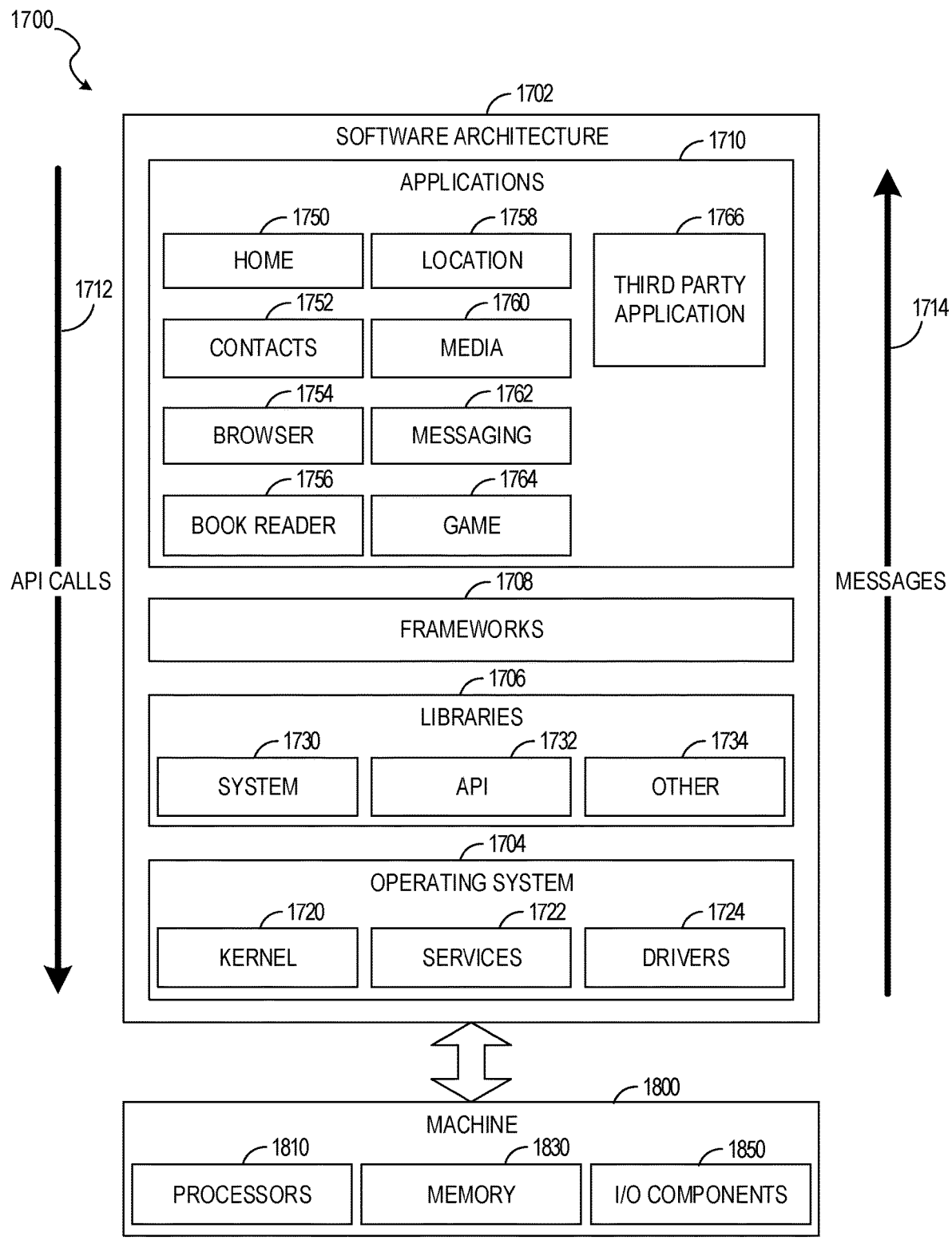
FIG. 17 is a block diagram illustrating an architecture of software, which can be installed on any one or more of the devices described above.

FIG. 17 is a block diagram 1700 illustrating a software architecture 1702, which can be installed on any one or more of the devices described above. FIG. 17 is merely a non-limiting example of a software architecture, and it will be appreciated that many other architectures can be implemented to facilitate the functionality described herein. In various embodiments, the software architecture 1702 is implemented by hardware such as a machine 1800 of FIG. 18 that includes processors 1810, memory 1830, and input/output (I/O) components 1850. In this example architecture, the software architecture 1702 can be conceptualized as a stack of layers where each layer may provide a particular functionality. For example, the software architecture 1702 includes layers such as an operating system 1704, libraries 1706, frameworks 1708, and applications 1710. Operationally, the applications 1710 invoke Application Program Interface (API) calls 1712 through the software stack and receive messages 1714 in response to the API calls 1712, consistent with some embodiments.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers, consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various graphical user interface (GUI) functions, high-level resource management, high-level location services, and so forth. The frameworks 1708 can provide a broad spectrum of other APIs that can be utilized by the applications 1710, some of which may be specific to a particular operating system 1704 or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications, such as a third-party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third-party application 1766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1766 can invoke the API calls 1712 provided by the operating system 1704 to facilitate functionality described herein.

Figure 18:
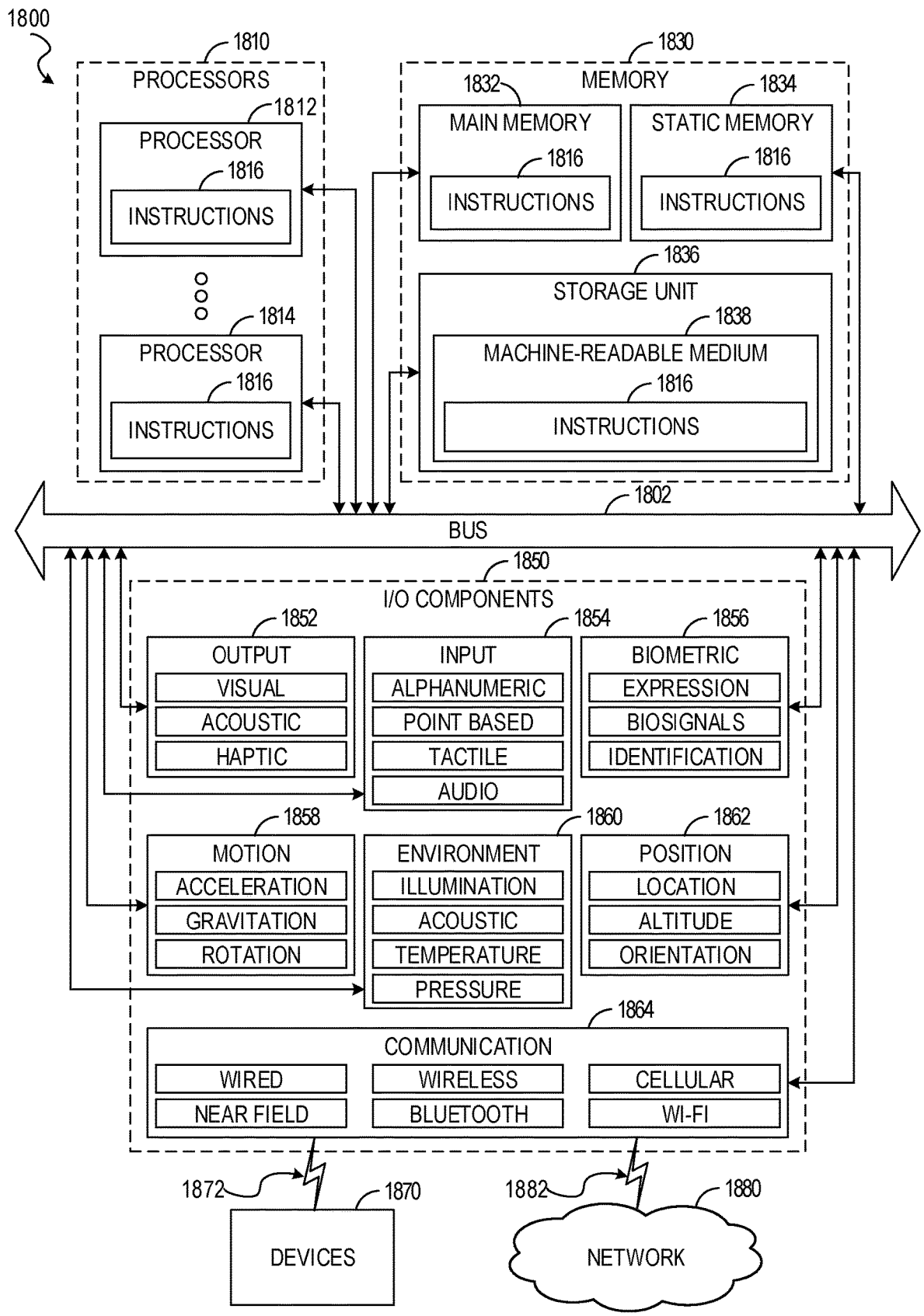
FIG. 18 illustrates a diagrammatic representation of a machine in the form of a computer system within which a set of instructions may be executed for causing the machine to perform any one or more of the methodologies discussed herein, according to an example embodiment.

FIG. 18 illustrates a diagrammatic representation of a machine 1800 in the form of a computer system within which a set of instructions may be executed for causing the machine 1800 to perform any one or more of the methodologies discussed herein, according to an example embodiment. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. For example, the instructions 1816 may cause the machine 1800 to execute the methods of FIG. 16. Additionally, or alternatively, the instructions 1816 may implement FIGS. 1-16 and so forth. The instructions 1816 transform the general, non-programmed machine 1800 into a particular machine 1800 programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 may include processors 1810, memory 1830, and I/O components 1850, which may be configured to communicate with each other such as via a bus 1802. In an example embodiment, the processors 1810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1812 and a processor 1814 that may execute the instructions 1816. The term "processor" is intended to include multi-core processors that may comprise two or more independent processors (sometimes referred to as "cores") that may execute instructions 1816 contemporaneously. Although FIG. 18 shows multiple processors 1810, the machine 1800 may include a single processor 1812 with a single core, a single processor 1812 with multiple cores (e.g., a multi-core processor 1812), multiple processors 1812, 1814 with a single core, multiple processors 1812, 1814 with multiple cores, or any combination thereof.

The memory 1830 may include a main memory 1832, a static memory 1834, and a storage unit 1836, each accessible to the processors 1810 such as via the bus 1802. The main memory 1832, the static memory 1834, and the storage unit 1836 store the instructions 1816 embodying any one or more of the methodologies or functions described herein. The instructions 1816 may also reside, completely or partially, within the main memory 1832, within the static memory 1834, within the storage unit 1836, within at least one of the processors 1810 (e.g., within the processor's cache memory), or any suitable combination thereof, during execution thereof by the machine 1800.

The I/O components 1850 may include a wide variety of components to receive input, provide output, produce output, transmit information, exchange information, capture measurements, and so on. The specific I/O components 1850 that are included in a particular machine will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion, and the grouping is in no way limiting. In various example embodiments, the I/O components 1850 may include output components 1852 and input components 1854. The output components 1852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1850 may include biometric components 1856, motion components 1858, environmental components 1860, or position components 1862, among a wide array of other components. For example, the biometric components 1856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1858 may include acceleration sensor components (e.g., accelerometer), gravitation sensor components, rotation sensor components (e.g., gyroscope), and so forth. The environmental components 1860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 may include a network interface component or another suitable device to interface with the network 1880. In further examples, the communication components 1864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., coupled via a USB).

Moreover, the communication components 1864 may detect identifiers or include components operable to detect identifiers. For example, the communication components 1864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1864, such as location via Internet Protocol (IP) geolocation, location via Wi-Fi® signal triangulation, location via detecting an NFC beacon signal that may indicate a particular location, and so forth.

The various memories (i.e., 1830, 1832, 1834, and/or memory of the processor(s) 1810) and/or the storage unit 1836 may store one or more sets of instructions 1816 and data structures (e.g., software) embodying or utilized by any one or more of the methodologies or functions described herein. These instructions (e.g., the instructions 1816), when executed by the processor(s) 1810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1880 or a portion of the network 1880 may include a wireless or cellular network, and the coupling 1882 may be a Code Division Multiple Access (CDMA) connection, a Global System for Mobile communications (GSM) connection, or another type of cellular or wireless coupling. In this example, the coupling 1882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1816 may be transmitted or received over the network 1880 using a transmission medium via a network interface device (e.g., a network interface component included in the communication components 1864) and utilizing any one of a number of well-known transfer protocols (e.g., Hypertext Transfer Protocol (HTTP)). Similarly, the instructions 1816 may be transmitted or received using a transmission medium via the coupling 1872 (e.g., a peer-to-peer coupling) to the devices 1870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1816 for execution by the machine 1800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
accessing a machine learned model, trained by a machine learning algorithm using training data to output a p-value for a KPI when presented with KPI data corresponding to the KPI from a plurality of different data sources, the p-value indicative of reliability of the KPI, the training data comprising sample key performance index (KPI) data from a plurality of sample entities;
receiving KPI data for an entity from a plurality of different data engines, the KPI data including data corresponding to a plurality of different KPIs;
feeding the KPI data into the machine learned model a first time, outputting a first p-value for each of the plurality of different KPIs;
updating the machine learned model based on the first p-value for each of the plurality of different KPIs;
filtering out the KPI data corresponding to KPIs whose first p-value does not transgress a first predetermined threshold, to create filtered KPI data;
feeding the filtered KPI data into the machine learned model a second time, outputting a second p-value for each of the KPIs in the filtered KPI data, the second p-value for a first of the KPIs being different than the first p-value for the first of the KPIs;
ranking the entity with respect to peer companies with respect to each KPI whose second p-value transgresses a second predetermined threshold; and
based on the ranking, classifying one or more of the KPIs as pain points of the entity.

2. The system of claim 1, wherein the ranking is performed using one or more rules specified in a rules logic.

3. The system of claim 1, wherein the ranking further comprises discarding all but top-N KPIs based on their respective second p-values, wherein N is an integer.

4. The system of claim 1, wherein the classifying of the one or more KPIs is performed by identifying whether the ranking of entity values with respect to peer companies with respect to each KPI whose second p-value transgresses a second predetermined threshold falls within a particular range for each KPI.

5. The system of claim 4, wherein the particular range is predicted for the entity based on entity features, using a second machine learned model.

6. The system of claim 1, wherein the operations further comprise:
performing natural language processing on the pain points and on a plurality of value driver definitions to match the pain points with value drivers described in the value driver definitions; and
providing a recommendation of one or more value drivers based on the one or more pain points.

7. The system of claim 1, wherein the machine learned model is a random forest tree learner with a separate decision tree for each of the plurality of different data engines.

8. The system of claim 1, wherein the first predetermined threshold is identical to the second predetermined threshold.

9. A method comprising:
accessing a machine learned model, trained by a machine learning algorithm using training data to output a p-value for a KPI when presented with KPI data corresponding to the KPI from a plurality of different data sources, the p-value indicative of reliability of the KPI, the training data comprising sample key performance index (KPI) data from a plurality of sample entities;
receiving KPI data for an entity from a plurality of different data engines, the KPI data including data corresponding to a plurality of different KPIs;
feeding the KPI data into the machine learned model a first time, outputting a first p-value for each of the plurality of different KPIs;
updating the machine learned model based on the first p-value for each of the plurality of different KPIs;
filtering out the KPI data corresponding to KPIs whose first p-value does not transgress a first predetermined threshold, to create filtered KPI data;
feeding the filtered KPI data into the machine learned model a second time, outputting a second p-value for each of the KPIs in the filtered KPI data, the second p-value for a first of the KPIs being different than the first p-value for the first of the KPIs;
ranking the entity with respect to peer companies with respect to each KPI whose second p-value transgresses a second predetermined threshold; and
based on the ranking, classifying one or more of the KPIs as pain points of the entity.

10. The method of claim 9, wherein the ranking is performed using one or more rules specified in a rules logic.

11. The method of claim 9, wherein the ranking further comprises discarding all but top-N KPIs based on their respective second p-values, wherein N is an integer.

12. The method of claim 9, wherein the classifying of the one or more KPIs is performed by identifying whether the ranking of entity values with respect to peer companies with respect to each KPI whose second p-value transgresses a second predetermined threshold falls within a particular range for each KPI.

13. The method of claim 12, wherein the particular range is predicted for the entity based on entity features, using a second machine learned model.

14. The method of claim 9, further comprising:
performing natural language processing on the pain points and on a plurality of value driver definitions to match the pain points with value drivers described in the value driver definitions; and
providing a recommendation of one or more value drivers based on the one or more pain points.

15. The method of claim 9, wherein the machine learned model is a random forest tree learner with a separate decision tree for each of the plurality of different data engines.

16. The method of claim 9, wherein the first predetermined threshold is identical to the second predetermined threshold.

17. A non-transitory machine-readable medium storing instructions which, when executed by one or more processors, cause the one or more processors to perform operations comprising:
accessing a machine learned model, trained by a machine learning algorithm using training data to output a p-value for a KPI when presented with KPI data corresponding to the KPI from a plurality of different data sources, the p-value indicative of reliability of the KPI, the training data comprising sample key performance index (KPI) data from a plurality of sample entities;

receiving KPI data for an entity from a plurality of different data engines, the KPI data including data corresponding to a plurality of different KPIs;

feeding the KPI data into the machine learned model a first time, outputting a first p-value for each of the plurality of different KPIs;

updating the machine learned model based on the first p-value for each of the plurality of different KPIs;

filtering out the KPI data corresponding to KPIs whose first p-value does not transgress a first predetermined threshold, to create filtered KPI data;

feeding the filtered KPI data into the machine learned model a second time, outputting a second p-value for each of the KPIs in the filtered KPI data, the second p-value for a first of the KPIs being different than the first p-value for the first of the KPIs;

ranking the entity with respect to peer companies with respect to each KPI whose second p-value transgresses a second predetermined threshold; and based on the ranking, classifying one or more of the KPIs as pain points of the entity.

18. The non-transitory machine-readable medium of claim 17, wherein the ranking is performed using one or more rules specified in a rules logic.

19. The non-transitory machine-readable medium of claim 17, wherein the ranking further comprises discarding all but top-N KPIs based on their respective second p-values, wherein N is an integer.

20. The non-transitory machine-readable medium of claim 17, wherein the classifying of the one or more KPIs is performed by identifying whether the ranking of entity values with respect to peer companies with respect to each KPI whose second p-value transgresses a second predetermined threshold falls within a particular range for each KPI.

* * * * *